(12) United States Patent
Du

(10) Patent No.: US 10,951,602 B2
(45) Date of Patent: *Mar. 16, 2021

(54) SERVER BASED METHODS AND SYSTEMS FOR CONDUCTING PERSONALIZED, INTERACTIVE AND INTELLIGENT SEARCHES

(71) Applicant: Integem Inc., Cupertino, CA (US)

(72) Inventor: Eliza Y. Du, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/750,821

(22) Filed: Jan. 23, 2020

(65) Prior Publication Data

US 2020/0162444 A1    May 21, 2020

Related U.S. Application Data

(62) Division of application No. 15/367,124, filed on Dec. 1, 2016, now Pat. No. 10,616,199.

(60) Provisional application No. 62/261,704, filed on Dec. 1, 2015.

(51) Int. Cl.
| | |
|---|---|
| *H04L 29/06* | (2006.01) |
| *G06F 21/62* | (2013.01) |
| *G06F 16/29* | (2019.01) |
| *G06F 16/9535* | (2019.01) |

(52) U.S. Cl.
CPC ............ *H04L 63/08* (2013.01); *G06F 16/29* (2019.01); *G06F 16/9535* (2019.01); *G06F 21/6209* (2013.01)

(58) Field of Classification Search
None
See application file for complete search history.

(56) References Cited

U.S. PATENT DOCUMENTS

| | | | |
|---|---|---|---|
| 7,233,684 B2* | 6/2007 | Fedorovskaya ...... | G06K 9/6293 382/118 |
| 7,761,464 B2* | 7/2010 | Radlinski ............ | G06F 16/9535 707/769 |
| 8,854,452 B1* | 10/2014 | Raffle ................... | H01H 13/64 348/115 |
| 8,880,548 B2* | 11/2014 | Wang .................. | G06F 16/3322 707/767 |
| 2005/0256866 A1* | 11/2005 | Lu ......................... | G06F 16/957 |
| 2008/0005067 A1* | 1/2008 | Dumais ............ | G06F 16/24575 |
| 2008/0005071 A1* | 1/2008 | Flake .................. | G06Q 30/0261 |
| 2008/0005091 A1* | 1/2008 | Lawler .................. | G06F 16/951 |
| 2009/0094225 A1* | 4/2009 | Cradick ................ | G06F 16/951 |
| 2012/0036011 A1* | 2/2012 | Schechter ........... | G06F 21/6263 705/14.49 |

(Continued)

*Primary Examiner* — Michael Pyzocha

(57) ABSTRACT

Existing search methods/systems are often generic and sometimes offer no user specific information. Disclosed herein are methods and systems for providing personalized, interactive, and intelligent search information. In particular, a search query is provided to a remote server and the remote server uses intelligent analysis for better interpreting and understanding user input and interactive user feedback concerning both search query quality and search result quality are provided to improve search quality and user experience, especially for accurate and intelligent searches in an interactive system (e.g., in an AR system). Using a remote server for query processing is advantageous because of its superior capability, including superior computing capacity.

22 Claims, 14 Drawing Sheets

(56) References Cited

U.S. PATENT DOCUMENTS

| | | | |
|---|---|---|---|
| 2012/0109993 A1* | 5/2012 | Reznik | G06F 16/583 707/765 |
| 2012/0209840 A1* | 8/2012 | Gur | G06F 16/242 707/733 |
| 2012/0233140 A1* | 9/2012 | Collins-Thompson | G06F 16/3338 707/706 |
| 2014/0032926 A1* | 1/2014 | Prem | H04L 9/14 713/189 |
| 2014/0095480 A1* | 4/2014 | Marantz | G06F 16/436 707/722 |
| 2014/0248950 A1* | 9/2014 | Tosas Bautista | G06F 1/1694 463/31 |
| 2014/0279860 A1* | 9/2014 | Pan | G06F 16/9537 707/609 |
| 2014/0280039 A1* | 9/2014 | Bach | G01C 21/3611 707/722 |
| 2014/0297617 A1* | 10/2014 | Rajakarunanayake | G06F 16/29 707/709 |
| 2014/0337174 A1* | 11/2014 | Lin | G06F 3/005 705/26.61 |
| 2014/0372123 A1* | 12/2014 | Go | G10L 13/08 704/260 |
| 2014/0379744 A1* | 12/2014 | Kuo | G06F 16/90324 707/767 |
| 2015/0160806 A1* | 6/2015 | Fey | G06F 3/0483 715/748 |
| 2015/0242930 A1* | 8/2015 | Greystoke | G06Q 30/0619 705/26.7 |
| 2015/0324698 A1* | 11/2015 | Karaoguz | G06F 3/015 706/46 |
| 2015/0339324 A1* | 11/2015 | Westmoreland | G06F 16/5866 707/733 |
| 2016/0055185 A1* | 2/2016 | Goel | G06F 16/319 707/744 |
| 2016/0080510 A1* | 3/2016 | Dawoud Shenouda Dawoud | H04N 21/4223 709/225 |
| 2016/0110453 A1* | 4/2016 | Kim | G06F 16/784 707/749 |
| 2016/0125655 A1* | 5/2016 | Tian | H04W 4/025 345/633 |
| 2016/0259977 A1* | 9/2016 | Asbun | A61B 5/1112 |
| 2016/0275352 A1* | 9/2016 | Rajappa | G06K 9/6215 |
| 2016/0364454 A1* | 12/2016 | Yang | G06F 16/9535 |
| 2016/0371340 A1* | 12/2016 | Waltermann | G06F 16/24575 |
| 2017/0132687 A1* | 5/2017 | Kim | G06Q 30/0625 |
| 2018/0032620 A1* | 2/2018 | Kasravi | G06F 16/335 |

\* cited by examiner

Google [ shoes ]

About 1,780,000,000 results

Shoes at XXX.com-Fast & Free shipping on Shoes
AD   www.xxx.com/shoes

XXX shop provides high quality men and women shoes....

Shoes at YYY.com-Gifts for everyone at YYY
AD   www.yyy.com/shoes

Shop women's shoes at YYY. Buy online and pick up from the store....

Men and Women's shoes. Shipped Free
www.aaa.com/shoes

Top quality men and women's shoes from Australia....

Shoes on Sale
www.bbb.com/shoes

Boots heels snackers & athletic shoes sandles flats view...

[1] [2] [3] [4] ... [Next]

FIG. 7A

Shoes for you:
  
★★★★★ (1500)     ★★★★★ (1200)     ★★★★☆ (1000)
Brand A XXX Shoes    Brand B XXX Shoes    Brand C XXX Shoes
$139.99     $139.99     $129.99
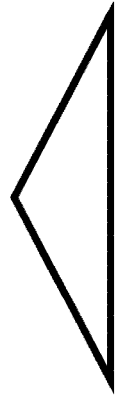 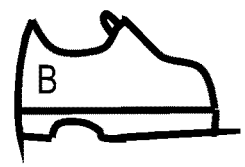  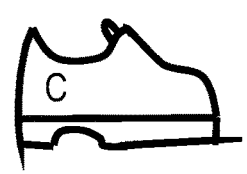 
★★★★★ (1800)     ★★★★★ (1300)     ★★★★☆ (1400)
Brand B YYY Shoes    Brand A YYY Shoes    Brand C YYY Shoes
$159.99     $169.99     $149.99
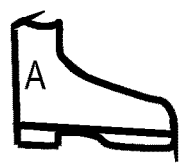 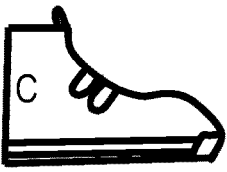 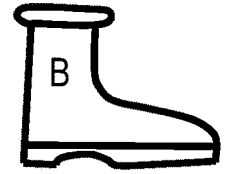
★★★★★ (1500)     ★★★★★ (1700)     ★★★★☆ (100)
Brand A XYZ Shoes    Brand B XYZ Shoes    Brand C XYZ Shoes
$189.99     $199.99     $169.99
FIG. 8

Google | John's shoes |

About 12,500,000 results

Shoes at John's XXX Shoes
AD    www.johnxxx.com/shoes

John's XXX shop provides high quality men and women elegant shoes....

Shoes at Mr . John YYY.com-Gifts for everyone at John YYY
AD    www.johnyyy.com/shoes Shop women's shoes at John YYY. Buy online and pick up from the store....

Smith shoes. Shipped Free
www.smithaaa.com/shoes

Top quality men and women's shoes from Smith AAA....

So you need some shoes/John's shop
www.johnbbb.com/shoes

Boots heels snackers & athletic shoes from John's shop view...

1  2  3  4  ...  Next

FIG. 9

Shoes for John:
★★★★★ (1500)
Brand A XXX Shoes Style 1
$39.99
★★★★★ (1200)
Brand B XXX Shoes
Style 1 $39.99
★★★★☆ (1000)
Brand C XXX Shoes
Style 1 $39.99
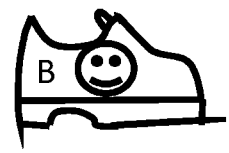
★★★★★ (1800)
Brand B XXX Shoes Style 2
$49.99
★★★★★ (1300)
Brand A XXX Shoes
Style 2 $49.99
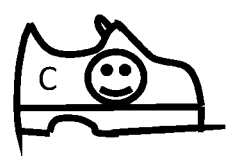
★★★★☆ (1400)
Brand C XXX Shoes
Style 2 $49.99
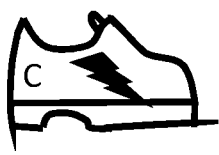
★★★★★ (1500)
Brand C XXX Shoes Style 3
$39.99
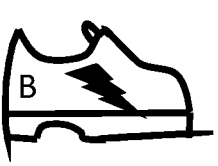
★★★★★ (1700)
Brand B XXX Shoes
Style 3 $39.99
★★★★☆ (100)
Brand A XXX Shoes
Style 3 $39.99
FIG. 10

Google | dance |

About 6,900,000,000 results

XXX Dance Academy
AD  www.xxxdance.com

Register today and dance with the best teacher in the world...

classes at YYY
AD  www.danceyyy.com/

YYY Dance studio offers a wide range of classes for children...

Dance Academy XXX-20 photos and 200 reviews
www.zzz.com>eduction>specialty schools>dance schools 200 reviews of Dance Academy xxx "I am very happy with the dance school...

Star AAA dance
www.staraaa.com/shoes

Star AAA dance academy at XXXX location is a Bollywood dance company ...

[1] [2] [3] [4] ... [Next]

FIG. 11

Search for dance:
Dance Music
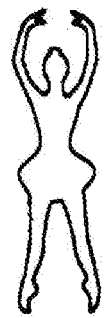
Dance Videos
Dance Dresses
Dance Classes
FIG. 12A

SERVER BASED METHODS AND SYSTEMS FOR CONDUCTING PERSONALIZED, INTERACTIVE AND INTELLIGENT SEARCHES

CROSS-REFERENCE TO RELATED APPLICATION

This application is a continuation of U.S. patent application Ser. No. 15/367,124 filed on Dec. 1, 2016 and entitled "Methods and Systems for Personalized, Interactive and Intelligent Searches," which claims priority to U.S. Provisional Patent Application No. 62/261,704, filed on Dec. 1, 2015 and entitled "A Personalized Smart Query System," both of which are hereby incorporated by reference herein in their entirety.

TECHNICAL FIELD

The disclosure generally relates to systems, devices and methods for a personalized, interactive and intelligent search engine for an augmented reality (AR) system.

BACKGROUND

Existing search engines such as Google or Bing are designed to work with the existing web-based or mobile phone-based system. A more interactive system (such as an augmented reality or AR system) has a whole new different kind of interface and system infrastructure. For example, existing search engines heavily depend on text input from users. In an AR system, however, input devices such keyboards or keyboard-like devices are often unavailable. Instead, a user uses gesture, voice, eye movement, body language etc., to conduct searches. In comparison with text input, input information from the user in an AR or AR-like platform is often more ambiguous, unobvious and less precise than text input. Simply adding a gesture recognition, voice recognition, and/or body language recognition into the system to translate the query info into text can be far from sufficient.

For example, in some AR systems, such as Microsoft Hololens, it can take voice as input for query. However, it just simply performs voice to text conversion and then using Bing (existing search engine) for search. As a result, this kind of AR search engines have the same problem as existing search engine that would be inefficient, inaccurate, and inconvenient for users to search information in the AR system.

What is needed in the art are improved systems and methods for receiving and processing input information from a user. Also needed are methods and systems for modifying and processing search queries generated from user input for more personalized, interactive and intelligent searches.

SUMMARY

Existing search methods/systems are inefficient, inaccurate, and inconvenient for users to interactively and intelligently search information; e.g., in an AR-based system. Intelligent analysis for better interpreting and understanding user input and interactive user feedback concerning both search query quality and search result quality are provided to improve search quality and user experience.

In one aspect, disclosed herein are novel, interactive and intelligent search systems/methods that allow a user to query information using user input such as hand gestures, voice, body languages, eye movements, facial expressions, in combination with or instead of traditional text input and file input.

In one aspect, disclosed herein are methods and system for dramatically reducing ambiguity issues that are associated with traditional search methods. For example, information relating to user biometrics, personal data, other people's data that the user has permission to access, date/time, geolocation, big data, and etc. are incorporated into a search query to improve search accuracy and relevance.

In another aspect, disclosed herein are methods and systems that enable interactions between a user and a search system during a search process to make the user's experience more natural and smooth, and making the search result more personalized, accurate and relevant.

In one aspect, disclosed herein are methods and systems for processing search results and presenting to users modified search results that have enhanced readability and are more user friendly.

In one aspect, disclosed herein includes a method for providing interactive and intelligent searches to a user. For example, the method comprises the steps of identifying, at a user device, a search query based on a user input; modifying the search query based on information accessible by the user device using artificial intelligence to render a modified query; communicating the modified query from the user device to a remote server; and receiving search results from the remote server.

In some embodiments, the information accessible by the user device comprises user biometric data, user personal data, other people's information that the user has permission to access, existing search records, information stored in the user device, system information of the user device, information that is extracted through real-time network communication at the time when the search query is modified, or any combinations thereof.

In some embodiments, the information that is extracted through real-time network communication comprises geolocation related information including location, map, weather, traffic, news, events, history, or combinations thereof.

In some embodiments, the user device comprises an input interface including a keyboard, a mouse, a touchscreen, a camera, a microphone, a game console, a sensor, or combinations thereof.

In some embodiments, the user device comprises a smart phone, a laptop, a tablet, a headset, a glass set, a goggle set, a gaming system, a computer with video and audio input capacity, or combinations thereof.

In some embodiments, the method further comprises a step of receiving, at the user device, the user input, wherein the user input comprises a file input, a voice input, a gesture input, an eye movement, a body movement, a text input, a facial expression, or combinations thereof.

In some embodiments, the method further comprises a step of modifying, at the user device, the modified query based on user feedback to render a further modified query.

In some embodiments, the method further comprises a step of receiving, at the user device, the user feedback.

In some embodiments, the method further comprises a step of communicating the further modified query from the user device to a remote server.

In some embodiments, the search results are processed, at the remote server or the user device, to enhance graphic elements from the search results for easy viewing. In some embodiments, the search results are processed, at the remote server or the user device, to remove restricted contents for child users.

In some embodiments, accessibility by a user to the information accessible by the user device requires authentication.

In one aspect, disclosed herein includes a computer system that comprises one or more processors; and a non-transitory computer readable medium including one or more sequences of instructions. These instructions, when executed by the one or more processors, cause the processors to: receive and identify a search query based on a user input; modify the search query based on information accessible by the user device using artificial intelligence to render a modified query; communicate the modified query from the user device to a remote server; and receive search results from the remote server.

In some embodiments, the information accessible by the user device comprises user biometric data, user personal data, other people's information that the user has permission to access, existing search records, information stored in the user device, system information of the user device, information that is extracted through real-time network communication at the time when the search query is modified, or any combinations thereof.

In some embodiments, the information that is extracted through real-time network communication comprises geolocation related information including location, map, weather, traffic, news, events, history, or combinations thereof.

In some embodiments, the search results are processed, at the remote server or the user device, to enhance graphic elements from the search results for easy viewing.

In some embodiments, the search results are processed, at the remote server or the user device, to remove restricted contents for child users.

In some embodiments, accessibility by a user to the information accessible by the user device requires authentication.

In one aspect, disclosed herein includes a non-transitory computer-readable storage medium having stored thereon program code instructions that, when executed by a processor of a message management service, cause the message management service to perform a method that comprises the steps of identifying, at a user device, a search query based on a user input; modifying the search query based on information accessible by the user device using artificial intelligence to render a modified query; communicating the modified query from the user device to a remote server; and receiving search results from the remote server.

In some embodiments, the information accessible by the remote server comprises user biometric data, user personal data, other people's information that the user has permission to access, existing search records, information stored in the user device, system information of the user device, information stored in the remote server, information that is extracted through real-time network communication at the time when the search query is modified, or any combinations thereof.

In some embodiments, the information that is extracted through real-time network communication comprises geolocation related information including location, map, weather, traffic, news, events, history, or combinations thereof.

In some embodiments, the search results are processed, at the remote server or the user device, to enhance graphic elements from the search results for easy viewing.

In some embodiments, the search results are processed, at the remote server or the user device, to remove restricted contents for child users.

In some embodiments, accessibility by a user to the information accessible by the user device requires authentication.

In one aspect, disclosed herein includes a non-transitory computer-readable storage medium having stored thereon program code instructions. These instructions, when executed by a processor of a message management service, cause the message management service to perform a method comprising the steps of receiving, at a remote server, a search query from a user device operated by the user; modifying, at the remote server, the search query based on information accessible by the remote server using artificial intelligence to render a modified query; providing, to the user device, search results based on the modified query; and receiving, from the user device, a further modified query based on user feedback.

In some embodiments, the information accessible by the remote server comprises user biometric data, user personal data, other people's information that the user has permission to access, existing search records, information stored in the user device, system information of the user device, information stored in the remote server, information that is extracted through real-time network communication at the time when the search query is modified, or any combinations thereof.

In some embodiments, the information that is extracted through real-time network communication comprises general trending search queries, general query meaning trend, domain specific trending search queries, domain specific query meaning trend, domain specific information, geolocation related information, or any combinations thereof.

In some embodiments, the geolocation related information comprises location, map, weather, traffic, news, events, history, or combinations thereof.

In some embodiments, the information stored in the remote server comprises general trending search queries, general query meaning trend, domain specific trending search queries, domain specific query meaning trend, domain specific information, geolocation related information, or any combinations thereof.

In some embodiments, the geolocation related information comprises location, map, weather, traffic, news, events, history, or combinations thereof.

In some embodiments, the search results are generated by the remote server or by a third-party server.

In some embodiments, the search results are processed to enhance graphic elements from the search results for easy viewing.

In some embodiments, the search results are processed, at the remote server or the user device, to remove restricted contents for child users.

In one aspect, disclosed herein includes method for providing interactive and intelligent searches to a user. The method comprises the steps of receiving, at a remote server, a search query from a user device operated by the user; modifying, at the remote server, the search query based on information accessible by the remote server using artificial intelligence to render a modified query; providing, to the user device, search results based on the modified query; and receiving, from the user device, a further modified query based on user feedback.

It would be understood that any embodiments disclosed herein can be applied, when applicable, in any aspect of the invention, alone or in any combination.

Details of one or more implementations are set forth in the accompanying drawings and the description below. Other features, aspects, and potential advantages will be apparent from the description and drawings, and from the claims.

DESCRIPTION OF DRAWINGS

Those of skill in the art will understand that the drawings, described below, are for illustrative purposes only. The drawings are not intended to limit the scope of the present teachings in any way.

FIG. 7A depicts a sample results page using a conventional search method.

FIG. 8 depicts a sample result page using a personalized, interactive and intelligent search method.

FIG. 9 depicts a sample results page using a conventional search method.

FIG. 10 depicts a sample result page using a personalized, interactive and intelligent search method.

FIG. 11 depicts a sample results page using a conventional search method.

FIGS. 12A and 12B depicts a sample result page using a personalized, interactive and intelligent search method.

Like reference symbols in the various drawings indicate like elements.

DETAILED DESCRIPTION

Overview

Figure 1:
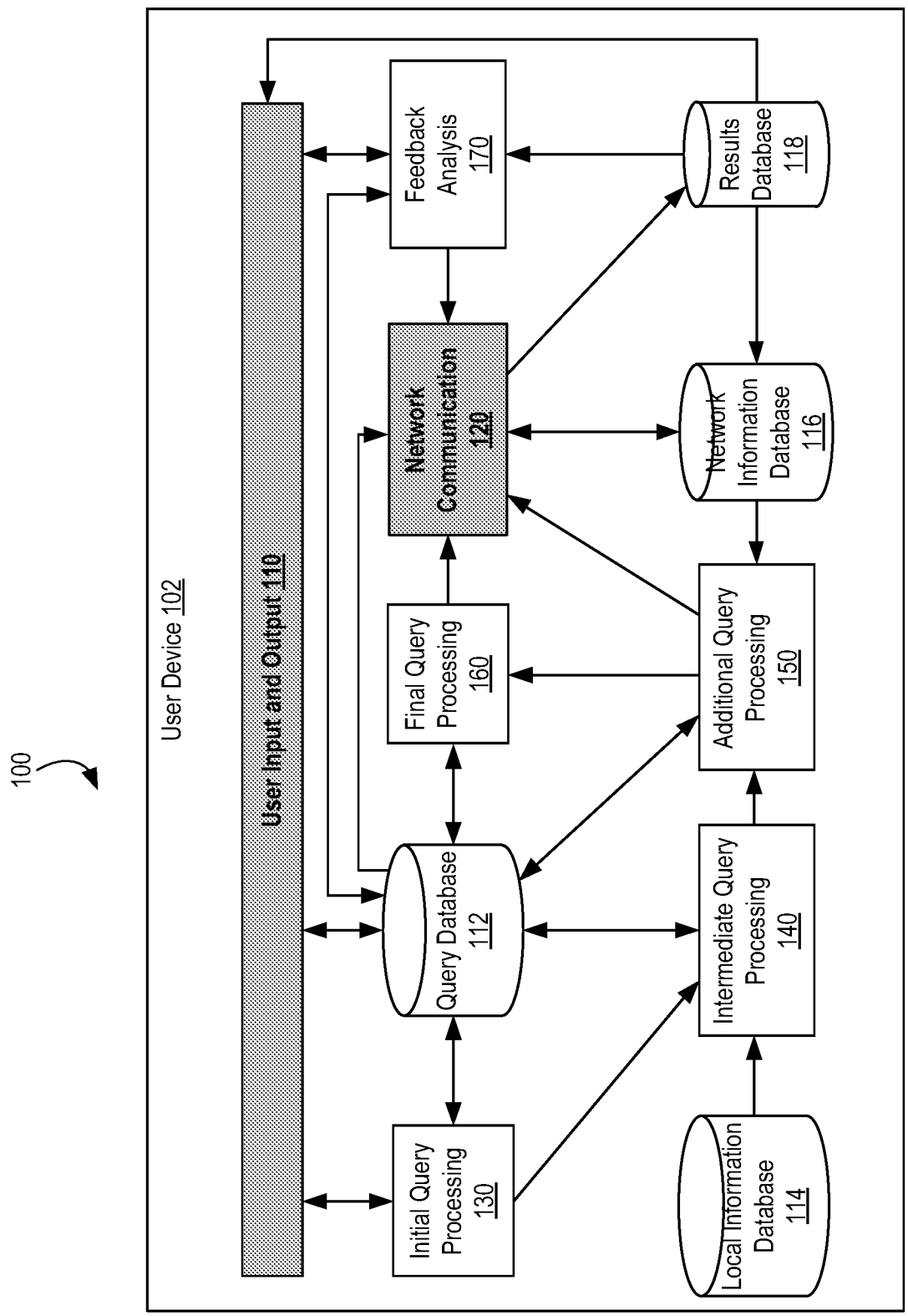
FIG. 1 depicts a block diagram of an example system for performing personalized, interactive and intelligent searches.

FIG. 1 is a block diagram of an example system 100 for performing personalized, interactive and intelligent searches. For example, system 100 (e.g., including user device 102) can perform personalized, interactive and intelligent searches by receiving user inputs that includes gestures, voices, eye movements via a user input and output module (I/O module) 110. The user input is analyzed and converted them to one or more machine understandable search queries in the initial query processing module 130. Example machine understandable queries are text, meta data, image matrix, digitized and processed voice signals, digitized and processed sensor data, features, templates, and etc. The search queries are then modified via a number of functional modules including intermediate query processing module 140, additional query processing module 150 and final query processing module 160. Queries are communicated via network communication module 120 to a remote server, where search queries can be further modified. Here, the remote server refers to any computer system that is the user device regardless of the actual physical distance from the user device. Searches will be performed either at the remote server or at a third party server. A number of database can be implemented to facilitate information flow. For example, user input and queries are stored in query database 112. Local information database 114 can be used to store information that will be restricted only to user device 102. Network information database 116 stores information that is downloaded to user device 102 via network communication module 120. Search results can be stored in a separate results database 118.

The systems and methods disclosed herein are particularly relevant for searches within the context of Augmented Reality (AR), Mixed Realty (MR) and Virtual Reality (VR), where user input is often minimal and can be subject to much interpretation.

Unless otherwise specified, Augmented Reality (AR) as disclosed herein refers to a live direct or indirect view of a physical, real-world environment whose elements are augmented (or supplemented) by computer-generated sensory input such as text, sound, video, graphics or sensor data. In some embodiments, a part of AR is considered to be Mixed Realty (MR). Mixed reality (MR), sometimes referred to as hybrid reality, is the merging of real and virtual worlds to produce new environments and visualizations where physical and digital objects co-exist and interact in real time. As disclosed herein, the terms MR, AR and to some extent VR can be used interchangeably. In other words, the AR system disclosed herein can include MR and VR systems. Although not limited to an AR or MR-based system, the systems and methods as disclosed herein are particularly advantageous for AR or MR-based systems for a number of reasons. However, it would be understood that the disclosed systems and inventions can be applied in any system, not limited to an AR-based system.

Augmented reality brings out the components of the digital world into a person's perceived real world. It is expected to replace PCs and smart phones in the future as the major personal "computer." More importantly, an augmented reality (AR) system provides novel human-machine interface. Existing search engines were designed for computer-based and/or mobile phone-based system. It does not take the AR characteristics into consideration, and as a result, it is not user friendly, it is inefficient, it is inaccurate, and it isn't convenient.

First, the input channel to an AR system is no longer just keyboard and mouse (computer systems); or Touch-based input (e.g., smart phones). Rather, the AR input system will be heavily dependent on voice, gesture, eye movement, body language, facial expression, etc. as system input. More importantly, the usage of keyboard, mouse, and/or touch based input may not exist in the AR system. In other words, the existing text-based input would be very inconvenient in the AR system. The existing search engine would not be convenient for the users.

Secondly, due to the change of the input channel, it may not be convenient for a user to type in text phrases to search. The existing search engine using text phrases to search the entire web/local system. However, in an AR system, input from user (e.g., gesture, eye movement, voice, body language, etc.) can be also subject to the system interpretation and as a result, the search information from the users in AR system can be a lot more ambiguity than the existing search engine can handle. The ambiguity of the search information would result in low accuracy if existing search engine is used.

Thirdly, the output from an AR system is very different from existing computer or smart phone based system. In the existing search engine, output search results would be in texts (several summary sentences per search result) with URL. In the AR display, this would not be visually appealing to the users. In other words, the search results from the existing engine may not be user friendly. More importantly, this does not take the advantage of the AR display (3D display capability and blend the search results with the real-life view, etc.). In other words, it would be impractical for users to read heavily dense texts in AR displays.

Fourthly, the existing search engine uses the computer system or smart phone system search/web browse cache to generate user profile. While this information can provide some info, it can be inaccurate (since there can be multiple people using the same PC/device). This info is not intrinsic to a person, which means it can't be used to accurately identify a user. And a user may use multiple devices/PCs to perform search. But in an AR system, the input can be from the user's gesture, voice, eye movement, body language, eye movement etc. This input itself provides the system intrinsic information of the user biometric information (e.g., voice, gesture, hand shape, finger shape, eye info etc.). More importantly, an AR system with camera can provide user face information, body shape, etc. All the rich information with continuous system non-intrusive monitoring can provide accurate user identification information for the system to further provide personalized search.

Also as disclosed herein, the terms "query" and "search query" can also be used interchangeably.

In some embodiments, system 100 can include user device 102. For example, user device 102 can be a computing device that is equipped to receive audio, video, and/or haptic input from a user, such as a smartphone, a tablet computer, a laptop computer, or a wearable device (e.g., smart watch, smart glasses, etc.). Exemplary AR devices include AR glass goggles (e.g., Microsoft® Hololens, Epson® Moverio glasses, etc.), and AR headset (e.g., Oakley® airwave, etc.). Exemplary MR system includes Microsoft Kinect in combination with an Xbox and a display; Intel® Realsense camera in combination with a computer, and etc. Exemplary smart-phone based AR systems can include virtually any smart phones that are equipped with a camera/mic and other sensors.

In some embodiments, user device 102 includes a user input and output module (I/O module) 110. For example, I/O module 110 can receive user input to user device 102 and present output from user device 102, using audio, video, motion, and/or haptic output mechanisms. For example, I/O module 110 can receive a gesture input, a body movement, or a voice input from a user. In some embodiments, I/O module 110 is also configured to detect and track eye movement, facial expression and etc. Also for example, I/O module 110 receive touch input from a touch sensitive display of user device 102. In other embodiments, the user input and output module can be coupled to other input devices, such as a keyboard, mouse, touch sensitive pad, etc., and receive user input from these devices. In some embodiments, user device 102 can receive multiple types of user input.

In some embodiments, I/O module 110 can also present audio, visual, motion, and/or haptic output to the user. For example, I/O module 110 can render graphical user interfaces (GUI) for performing personalized, interactive and intelligent searches, as described herein. I/O module 110 can present GUIs that enable or support the functionality of one or more of the personalized, interactive and intelligent search methods/systems described herein, including but not limited to initial query processing module 130, intermediate query processing module 140, additional query processing module 150 and final query processing module 160. In some embodiments, the user input and output module includes a plurality of menu commands, each corresponding to the functionality of one or more of the query processing modules. In some embodiments, I/O module 110 allows a user to browse through search results through a plurality of menu commands. Additionally, I/O module 110 allows a user to browse through search results by a voice command, a gesture, a motion, an eye movement, a facial expression or combinations thereof. In some embodiments, I/O module 110 can allow a user to enter voice commands for performing query modification, as described herein. For example, the user can tell I/O module 110 to expand or narrow searches by including and excluding certain type of data. In such embodiments, the further modification of a query can be done in conjunction with feedback analysis module 160. Additionally, for example, I/O module 110 can allow a user to enter commands by tapping a touch screen.

In some embodiments, user device 102 can include query database 112. For example, query database 112 includes input that is received from a user and saved on user device 102. In some embodiments, such input data can be used to train a user device to recognize input from one or more particular users.

The functionality is achieved by connecting different query processing modules (e.g., modules 130, 140, 150 and 160) to a centralized query database 112, as illustrated in FIG. 1. In some embodiments, a user can store images at various stages of query processing in query database 112. As disclosed herein, the terms "processing module" and "module" are used interchangeably.

In some embodiments, user device 102 can include initial query processing module 130. For example, a user can choose (e.g., via user input and output module 110) to process a user input or a query that is already stored in query database 112. In some implementations, initial query processing module 130 can receive information directly from I/O module 110 for processing. In some embodiments, initial query processing module 130 receives information that is already saved in user device 102; e.g., stored in query database 112.

In some embodiments, at any query processing stage, a user can provide instant feedback if a search query derived is unsatisfactory. A user can provide feedback before a search is performed based on the search query at issue. Alternatively, a user can provide feedback after searches are performed upon receiving/evaluating the results; e.g., via feedback analysis module 160.

Figure 6:
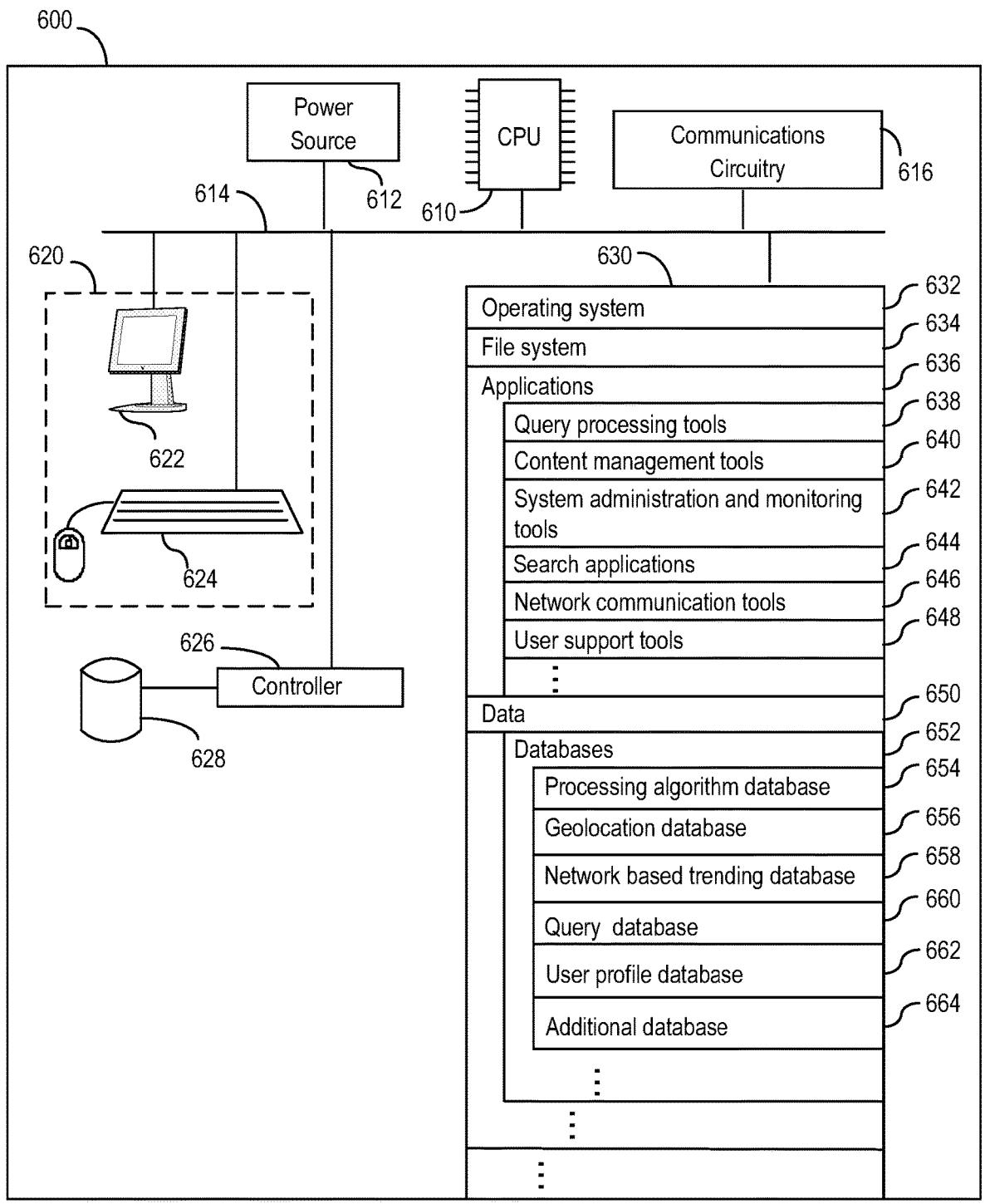
FIG. 6 depicts a block diagram of an example system architecture implementing for the features and processes of FIGS. 1-4.

Initial query processing module 130 processes and converts user input to search queries that can be either further processed either at user device 102 or a remote server (e.g., system 600 in FIG. 6)

With the advancement of technologies, storage devices with larger storage capacity have become cheaper and more user-accessible. At the same time, wide usage of smart devices (e.g., smart phones, IoTs, laptops, etc.) leads to more and more data being stored in a local user device. In addition, more and more users are used to uploading and sharing data generated from their person devices. As a result, huge quantity of data are generated and accessible to individual users via various network platforms. Searching within such platforms to identify accurate search result can be a daunting problem. To accurately identify the most relevant information efficiently can be even more challenging.

Most existing search engines use input text to directly search from huge scale database. This type of search is inefficient and often could not provide satisfactory results. In particular, when a search phase or text is short and ambiguous, search results could be far from what the user wanted.

One factor that leads to such inefficiency and inaccuracy is that existing search engines are not personalized. They are not able to discriminate one user from another user in the search process. Search results are often generic to different users instead of being customized to individual users.

As disclosed herein, search queries are processed based on personalized information to efficiently narrow search scope to provide more accurate and relevant results. For example, a number of approaches, such as those embedded in intermediate query processing module 140, additional query processing module 150 and final query processing modules, are used to modify search queries to improve search accuracy and relevance. Any information that is accessible to the user (e.g., via I/O module 110 on device 102) can be used to modify a search query.

In some embodiments, intermediate query processing module 140 can modify a search query using information that is only stored locally on user device 102. For example, such locally stored information include but is not limited to the user's identity, age, height, weight, general, family relations, habits and preferences (gained either through user input or from a user's activities), biometric data (e.g., a person's face, oculus, voice, iris, sclera, body posture, fingerprint, palm prints, body movements, gesture, gait, and/or hand shape) and etc. In some embodiments, the personalized data are stored in local information database 114. For privacy concerns, it is possible to restrict access to some portion of local information database 114 from either online or offline. Unlike another database, such as network information data 116, the private information in the local information database 114 will never be accessible by other users/devices/networks without express user permission.

In some embodiments, intermediate query processing module 140 can modify a search query by adding metadata that reflect at least some of the personalized data associated with a user. In a simple example, a user searches for "shoes." Personalized data indicate that the user is female and wears size 7. The search query can be modified as "woman shoe size 7" for more relevant search results.

In some embodiments, personalized data such as biometric data can be used to authenticate a user for accessing user device 102 to conduct searches. In particular, a user can be identified through biometric data that include but not limited to a person's face, oculus, voice, iris, body posture, fingerprint, palm prints, body movements, gesture, gait, hand shape, and etc. In some embodiments, I/O module 110 collects real-time biometric data and compares them with the authentication data on local information database 114. If there is a match, intermediate query processing module 140 is allowed access to personalized data in local information database 114 when processing a search query. If there is no match, intermediate query processing module 140 will only be able to access information that is not deemed personalized and private. In some embodiments, a user can designate level of access to data stored on intermediate query processing module 140 such that an unauthenticated user can only have limited access to data stored on intermediate query processing module 140. For example, such authentication scheme can be applied in parental control to user device 102. A child may not be able to generate queries that require access to personalized and private data of a parent. In some embodiments, local information database comprises system information associated with user device 102 such as data/time and geolocation-related information. In some embodiments, local information database 114 comprises previous searches and search results by the particular user. In some embodiments, previous searches and search results may be stored in query database 112.

In some embodiments, queries generated by intermediate query processing module 140 are sent to query database 112. In some embodiments, queries generated by intermediate query processing module 140 are communicated to additional query processing module 150.

Additional query processing module 150 can further modify a search query based on network-derived information such as what is stored on network information database 116. For example, weather information, weather change information, location information, geolocation related news and event can be assessed when modifying a search query. For example, a user searches "mask" around Halloween time, modification by initial query processing module 130 and intermediate query processing module 140 may lead to search results relating to Halloween costume. Further processing at additional query processing module 150, however, identifies that a major event associated with the user's precise geolocation; for example, a major fire is currently underway and has severely impaired local air quality. It is more likely that the user is looking for a face mask for outdo or to avoid bad air qualify. In some embodiments, the search query is further modified by additional query processing module 150 to replace "Halloween mask" with "respirator mask." In some embodiments, additional query processing module 150 can decide to take a comprised approach and structure the query such that results relating to both "Halloween mask" with "respirator mask" are presented to a user for feedback.

As illustrated above, there are time and location sensitivities associated with the processing at additional query processing module 150. As such, it is important that data stored in network information database 116 be at least periodically updated to provide the most up-to-date information. In some embodiments, processing at additional query processing module 150 may be associated with a real-time update of selected information on network information database 116.

In some embodiments, final query processing module 160 can reconcile differences between different query processing modules (e.g., 130, 140 and 150). For example, in the example above concerning "mask," final query processing module 160 can render final search queries based on a likelihood score computed for each option; for example, based on real-time network information concerning either option. Final query processing module 160 then generates queries such that search results relating to both options are returned, but at a pre-determined ratio based on the relative likelihood scores.

In some embodiments, a query can be sent to a server via network communication module 120 at any processing stage (e.g., 130, 140, 150 and 160). Indeed, queries can be sent to a server via network communication module 120 at any stage of the processing. In some embodiments, search queries are sent to a server after initial processing at initial processing module 130. In some embodiments, search queries are sent to a server after processing at intermediate processing module 140. In some embodiments, search queries are sent to a server after additional processing at additional processing module 150. In some embodiments, search queries are sent to a server after final processing at final query processing module 150.

In some embodiments, any one of the processing modules (e.g., 130, 140, 150 and 160) can help the user to set search preferences (e.g., number of hits they'd like to receive and the style in which the results should be presented). In some embodiments, such general preference information is set by the user device in a database; for example, the query database 112. Any query communicated to the remote server will also be accompanied with such general preference information. In some embodiments, such general preference information may be stored on the remote server; for example, in a user specific profile database.

On the server, the query can be further modified before a search based on the query is performed either on the server or through a third party search engine.

Search results are returned to user device 102 from the server. In some embodiments, the search results are presented to the user via I/O module 110. A user can provide feedback concerning the search results. The feedback can be of the same type as that of the initial user input. The feedback can also be of a different type from that of the initial user input. The user feedback is processed by feedback analysis module 170. Initial query processing module 130 and feedback analysis module 170 both process user input information. In some embodiments, their sensitivity levels to user emotions are set the same. In some embodiments, their sensitivity levels to user emotions are different from each other. For example, feedback analysis module 170 can be more sensitive to user emotions than initial query processing module 130. In some embodiments, the query that was used to perform the search (for which the search results were generated) can be further modified by feedback analysis module 170. In some embodiments, the further modified query is sent to the server again via network communication module 120. In some embodiments, the further modified query is sent to and stored on query database 112.

In some embodiments, a user can specify, before or during a search, a limit on the number of search results the user would like to receive. In some embodiments, such a limit can be specified in a user preference profile for the user. In some embodiments, such a limit can be specified as part of the user feedback.

Feedback analysis can also be performed a query at any processing stage (e.g., 130, 140, 150 and 160). This feature can be enabled by allowing every query processing module to communicate with a central query database (query database 11), which can then directly communicate with feedback analysis module 170.

Although query processing is disclosed above in a separate and sequential manner, one of skill in the art would understand that different type of processing can be combined in any applicable manner. For example, initial processing at module 130 can be combined in one processing step with intermediate processing at module 140. Also, module 130, module 140 and module 150 can be combined in one processing step. In some embodiments, module 130, module 140, module 150 and module 160 can be combined. In some embodiments, module 130 and module 150 can be combined. In some embodiments, module 140 and module 150 can be combined. In some embodiments, module 140, module 150 and module 160 can be combined. It is also possible to skip one or more processing module and have a current query be directly communicated to a remote server via network communication module 120.

Figure 2:
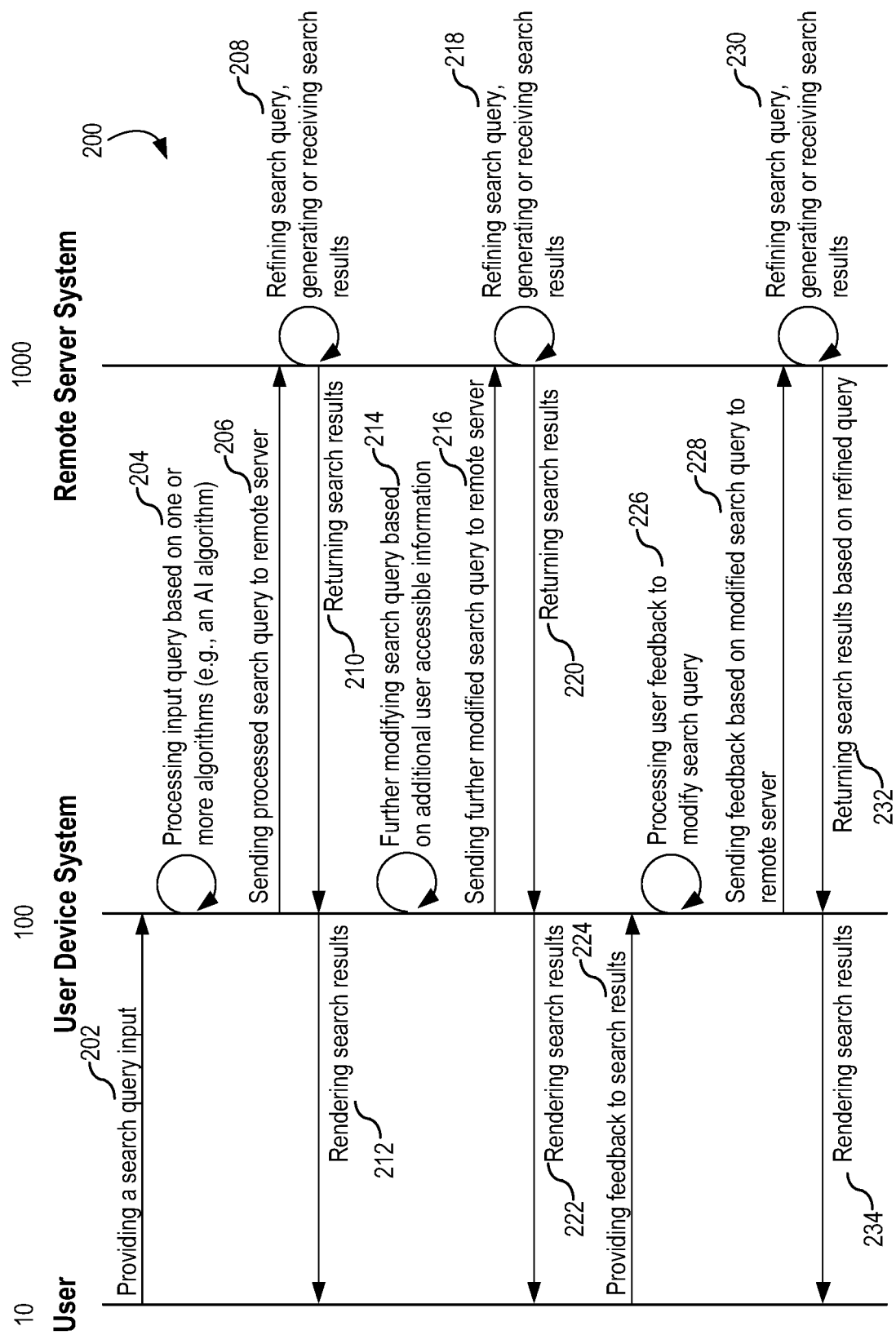
FIG. 2 illustrates sample information flow between components of a sample system for performing personalized, interactive and intelligent searches.

FIG. 2 illustrates sample information flow between components of a sample system 200 for performing personalized, interactive and intelligent searches. Three main components or players of system 200 are user 10, user device system 100 and remote server system 1000.

At step 202, a user provides input for a search query to user device system 200. The input can be in any possible form based on hardware availability of user device system 200. Exemplary input includes but is not limited to voice, gesture, eye movement, body language, motions, emotions, in addition to text and conventional file.

On user system 100 and at step 204, the user input is processed (e.g., at initial query processing module 130) based on one or more mechanisms, using, for example, artificial intelligence. Example artificial intelligence methods include but are not limited to deep learning (such as Convolutional Neural Network or CNN, Recurrent Neural Network or RNN, any combination of CNN and RNN, and etc.), wide learning, neural networks, self-organization map, reinforcement learning, clustering mechanism, traditional feature extraction and pattern recognition methods (e.g., descriptor-based methods, Hidden Markov model, etc.), knowledge graph, machine learning methods, and any combination of two or more mechanisms. The processed query can then be sent to remote server system 1000 via network communication module 120 at step 206.

At step 208, the query received at remote server system 1000 can be refined; for example, based on internet trending data. In some embodiments, refinement may not be necessary. Instead, the query causes the server to generate search results based on the query received at step 208. Alternatively, the query is sent to a third party search engines and the resulting search results are received at remote server system 1000.

At step 210, the search results are sent back to user device system 100 via network communication module 120 before they subsequently presented to user 10 at step 212. In some embodiments, the results presented to user 10 are modified/processed for enhanced readability. For example, key graphic elements from search results can be extracted in addition to certain important information; e.g., price information of a particular product or contact information of a person. Preferably, modification of search results can be performed on remote server system 1000, because remote server system 1000 likely has better computing capacity for such processing. It is also possible to have the modification of search results performed by user device system 100.

In some embodiments, for example after processing step 204, the modified query can be further modified at step 214, based on information that is user accessible (e.g., at intermediate query processing module 140, additional query processing module 150, or final query processing module 160). Exemplary user accessible information includes but is not limited to user biometric data, user personal data, other people's information that the user has permission to access, existing search records, information stored in the user device, system information of the user device, information that is extracted through real-time network communication at the time when the search query is modified, or any combinations thereof.

At step 216, the further modified query is sent to remote server system 1000.

At step 218, the query received at remote server system 1000 can be refined; for example, based on internet trending data. In some embodiments, refinement may not be necessary. Instead, the query causes the server to generate search results based on the query received at step 218. Alternatively, the query is sent to a third party search engines and the resulting search results are received at remote server system 1000.

At step 220, the search results are communicated from remote server system 1000 to user device system 100 via network communication module 120. In some embodiments, the results presented to user 10 are modified/processed for enhanced readability. For example, key graphic elements from search results can be extracted in addition to certain important information; e.g., price information of a particular product or contact information of a person. Preferably, modification of search results can be performed on remote server system 1000, because remote server system 1000 likely has better computing capacity for such processing. It is also possible to have the modification of search results performed by user device system 100.

The enhanced search results are rendered and presented to user 10 at step 222. If unsatisfied, the user provide feedback (e.g., via I/O module 110) to user device system 100 at step 224. The feedback is then used to further modify the search query (e.g., via feedback analysis module 170) at step 226.

At step 228, the further modified query is sent to remote server system 1000. At step 230, the query received at remote server system 1000 can be refined; for example, based on internet trending data. In some embodiments, refinement may not be necessary. Instead, the query causes the server to generate search results based on the query received at step 230. Alternatively, the query is sent to a third party search engines and the resulting search results are received at remote server system 1000.

At step 232 START HERE, the search results are communicated from remote server system 1000 to user device system 100 via network communication module 120. In some embodiments, the results presented to user 10 are modified/processed for enhanced readability. For example, key graphic elements from search results can be extracted in addition to certain important information; e.g., price information of a particular product or contact information of a person. Preferably, modification of search results can be performed on remote server system 1000, because remote server system 1000 likely has better computing capacity for such processing. It is also possible to have the modification of search results performed by user device system 100.

At step 234, enhanced search results are rendered on user device system (e.g., on user device 102). A user may choose to provide further feedback.

As discussed in connection with FIG. 1, user 10 has the option to provide feedback during any stage when the query is being processed. The system 100 is configured such that user feedback can be saved and used to train the system. Various mechanisms (e.g., learning mechanisms) can be used to further develop and improve the intelligence of the system.

Figure 3:
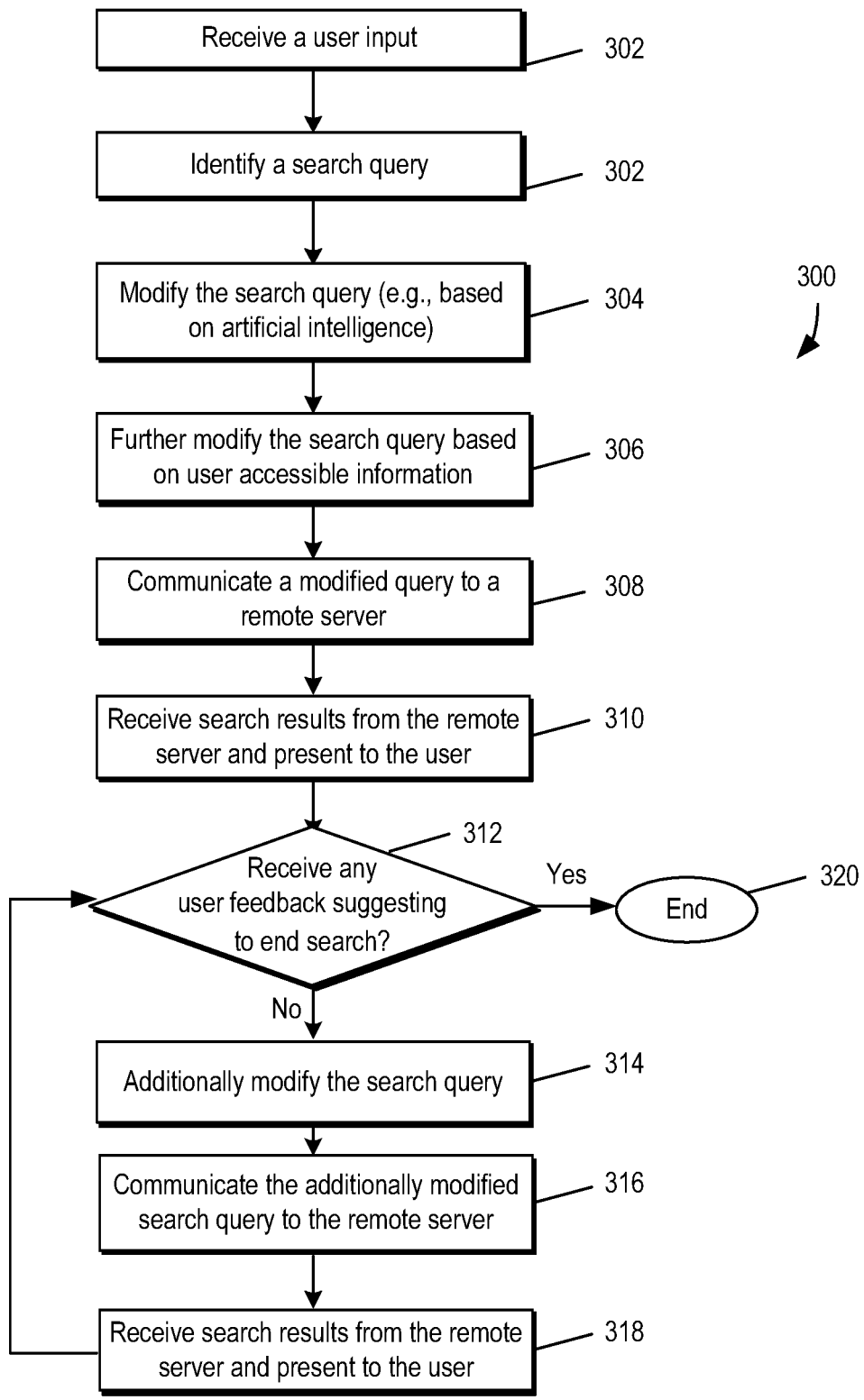
FIG. 3 depicts a flow diagram of a process of an example method for performing personalized, interactive and intelligent searches.

FIG. 3 depicts a flow diagram of an example process 300 of a method for performing personalized, interactive and intelligent searches. As disclosed herein, process 300 takes place on user device 102.

At step 302, user device 102 receives input from a user; e.g., via I/O module 110. In some embodiments, a query input can be typed in text as existing search engine Google/Bing did. In some embodiments, a query input can be a file that contains text, sound (including voice), image (bmp, jpg, gif, etc.), video, 3D, and etc. In some embodiments, a query input include directly input from the AR system sensors: from camera, microphone, and other kinds of sensors.

In some embodiments, a query input from the camera is a real-time video of the user and environment. The video can be 2D or 3D. It can be visible, Near Infrared, Infrared, etc.

In some embodiments, a query input from the microphone is a real-time voice of the users and the environment. In some embodiments, other kinds of sensors can be used, including, for example, but not limited to accelerator, gyro, motion, temperature, pressure, heart rate, etc.

At step 304, user input provided at the previous step is analyzed (e.g., by artificial intelligence at initial query processing module 130) to extract a search query. For example, a system disclosed herein can be configured to support different kinds of user input and query data. In particular, in some embodiments, an artificial intelligence based analysis can be performed.

Unlike humans, machines cannot directly understand human language, recognize information from images, or make sense out of the sensor data. In some embodiments, an artificial intelligence engine is developed to first analyze the query data. Here, the artificial intelligence engine may use a deep learning mechanism (such as Convolutional Neural Network or CNN, Recurrent Neural Network or RNN, or a combination of CNN and RNN, and etc.), a wide learning mechanism, a neural network-based mechanism, a self-organization map, a reinforcement learning mechanism, traditional feature extraction and pattern recognition methods (e.g., descriptor-based methods, Hidden Markov model, etc.), a knowledge graph, machine learning methods, and any combinations thereof.

As disclosed herein, a system can perform different tasks in response to different user input type. The following provides a few examples for illustration purposes and should not in any way be limiting to the scope of the current method/system. For example, if input is text, natural language understanding will be applied. If input is an image, a video, or a sound, scene understanding will be applied. If sound input is a human voice, voice recognition and natural language understanding can be performed. The system can transfer the voice into text interpretation first and then apply natural language understanding. If input is from a camera, scene understanding, gesture recognition, facial expression recognition, body language analysis, and etc. can be applied. If input is from a microphone, voice recognition is first performed followed by the natural language understanding, scene understanding from the sound. If input is a type of sensor data, sensor data understanding will be applied.

As disclosed herein, query information is the digested information from a processing module (e.g., initial query processing module 130 or any other processing module). The information is in machine understandable language. For example, query information can include but are not limited to hashed information, features, structured data, unstructured data, text phases, metadata, sound signals, image matrixes, templates, and etc.

At step 306, search query extracted from user input using artificial intelligence can be modified based on user accessible information (e.g., at processing module 140 and/or processing module 150). Any information accessible by a user via the user device can be used, including but not limited to, for example, user biometric data, user personal data, other people's information that the user has permission to access, existing search records, information stored in the user device, system information of the user device, information that is extracted through real-time network communication at the time when a search query is modified, or combinations thereof.

In particular, a processing module at this step (e.g., any of modules 130-170) can recognize a person using his/her face, oculus, voice, iris, body posture, fingerprint, palm prints, body movements, gesture, gait, hand shape, etc. Biometric-based methods can be combined with other method (e.g., user name, pin, password, etc.) to provide recognition and authentication.

In some embodiments, multimodal and multi-stage recognition are performed. In some embodiments, the method disclosed herein can recognize a person based on face recognition and oculus recognition. For multi-stage recognition, an example is that the system can first recognize the user using face recognition. Based on a user voice and provide more accurate recognition. When the user spends more time with the system, the recognition accuracy can go up.

In some embodiments, methods disclosed herein can recognize a person based on soft biometrics information, such as hair styles, clothes, etc. In some embodiments, biometric-based recognition may not be just one-time authentication. Instead, it can be a continuous recognition process. For example, the system can continuously refine its recognition based on the user's multiple point voice input or gesture.

As disclosed herein, no separate input from the user is needed when the biometrics-based query modification or user recognition/authentication. Rather, the system can automatically perform continuous recognition of the user in the background while the user interacts with the system. This would be non-intrusive to the user and can achieve much higher recognition accuracy through adaptive learning and reinforcement learning.

As disclosed herein, a database including sensitive and private personal information is secured. Such a database can be located in the local system, the cloud, or a combination of local system and cloud. In some embodiments, it is possible to have different levels of security for different information on the same server. For example, a child using a parent's device will not have the same level of access as the parent does.

Based on the biometrics information, a system can recognize the user and further extract the user's personal data based on information stored on a user device for the authenticated user.

Additional user accessible information includes but is not limited to user information, date/time information, geolocation information, location information, and big data information.

In some embodiments, user information includes the user ID, the user personal parameters, such as height, weight, clothes' size, shoe size, health information, financial information, past user activity information, and etc. Date and time is the date and time when the user is doing the query. This is automatically extracted from the AR system time stamp.

In some embodiments, a processing module (e.g., any of 130-170) can extract the information for the system (e.g., an AR-based) to get the location information such as news and events, weather information, weather change information, etc. In some embodiments, geolocation information can be extracted from GPS, WIFI signal, wireless communication signal, and etc. Location information provides the detailed information of the location. This can include the time region, GPS location, weather information, past weather information, altitude, local geological information (mountain, flat, ocean, etc.), etc.

In some embodiments big data information can be used when modifying a query. As disclosed herein, big data information include that information that is available from internet/cloud. As such, such information will be accessed interactively at the time when modifying a query. Exemplary big data information includes but is not limited to recent popular query, events, domain knowledge and other related information. In particular, the domain knowledge is an important part of this type of data. Same searches from different people may mean different things due to the search domain differences. For example, when a regular user search for shoes, it would be more likely to search for shoes to buy. While a shoe designer search for shoes, it would be more likely to search for shoe designs and more professional shoe information.

At step 308, a modified query is communicated from user device 102 to a remote server via network communication module 120.

At step 310, a user received search results from a search using the modified query from step 308. As disclosed hereinabove, searches can be performed on the remote server or at a third party search engine.

At step 312, a decision is made whether a user, upon reviewing the search results, provides any feedback that the search has completed. If the user indicates that the search results are satisfactory, the process jumps to step 320 and ends. If the user suggests that additional improvement is needed, additional modification of the search query will be performed (e.g., at step 314). Following additional modification, the further modified query is sent to the remote server at step 316.

At step 312, a user can then choose the search result based his/her needs from the search results that the system presented to him/her. There are several major advantages over the existing search engines in our design in this module. In the existing approach, after the user chooses the search result, it would be a URL link to a website, or sometimes, a link to an app. If the user is unsatisfied with the search results, the user will need to decide whether to refine the search and add/change the search phrase to continue search. This is inconvenient for the user.

In the current system, totally different approaches are used. First, after the user chooses the search result, it can be a URL link to a website or an app as the existing approach. More than that, the search result would also support 3D/2D visual displays (e.g., images, videos, animations, and etc.). The first level of the feedback from the user would be whether the user is satisfied with the search result. This part can be explicitly and inexplicitly. For example, explicitly feedback can be the user telling the AR system to finish search, or the user telling the system to refine the search. Example inexplicitly feedbacks can be the user continue into the search result and stay with there. If the user wants to refine the search, in our design, the AR system would interact with the user to ask for feedback input to help refine the search. In some embodiments the system as disclosed herein can continuously non-intrusively monitors the user feedback.

As disclosed herein, user feedback input can be typed in text as existing search engines Google/Bing do. User feedback input can be a file that contains text/image/sound/sensor data, text, sound (including voice), image (bmp, jpg, gif, etc.), video, and 3D, etc. In some embodiments, user feedback input can be directly input from sensors associated with the system: from camera, microphone, and other types of sensors.

For example, user feedback input from camera is a real-time video of the user and the environment. The video can be 2D or 3D. It can be visible, Near Infrared, Infrared, etc. User feedback input from the microphone is a real-time voice of the user and the environment. The other kinds of sensors can be accelerator, gyro, motion, temperature, pressure, heart rate, etc.

As disclosed herein, feedback information is the digested information from an AI-based feedback analysis module (e.g., module 170 on user device 102). This information is in machine understandable language. The feedback information can be hashed information, features, structured data, text phases, etc.

In some embodiments, feedback information can be input to a query processing module (e.g., any one of modules 130-170 or the AI-based Fusion engine on a server) and to a user-specific database (e.g., database 114 or a database on the remote server.

At step 318, search results based on the further modified query are returned to user device 102.

Steps 312-318 can be iterative. From step 318, the method loops back to step 312, at which, the question whether user feedback suggestion satisfaction (hence ending the process) will be prompted again. If the answer is no, steps 314 through 318 will be repeated.

In some embodiments, a certain level of autonomy is built into the system. As a result, many aspects of the functionality of the user device can be automatically run with no or little user input.

Figure 4:
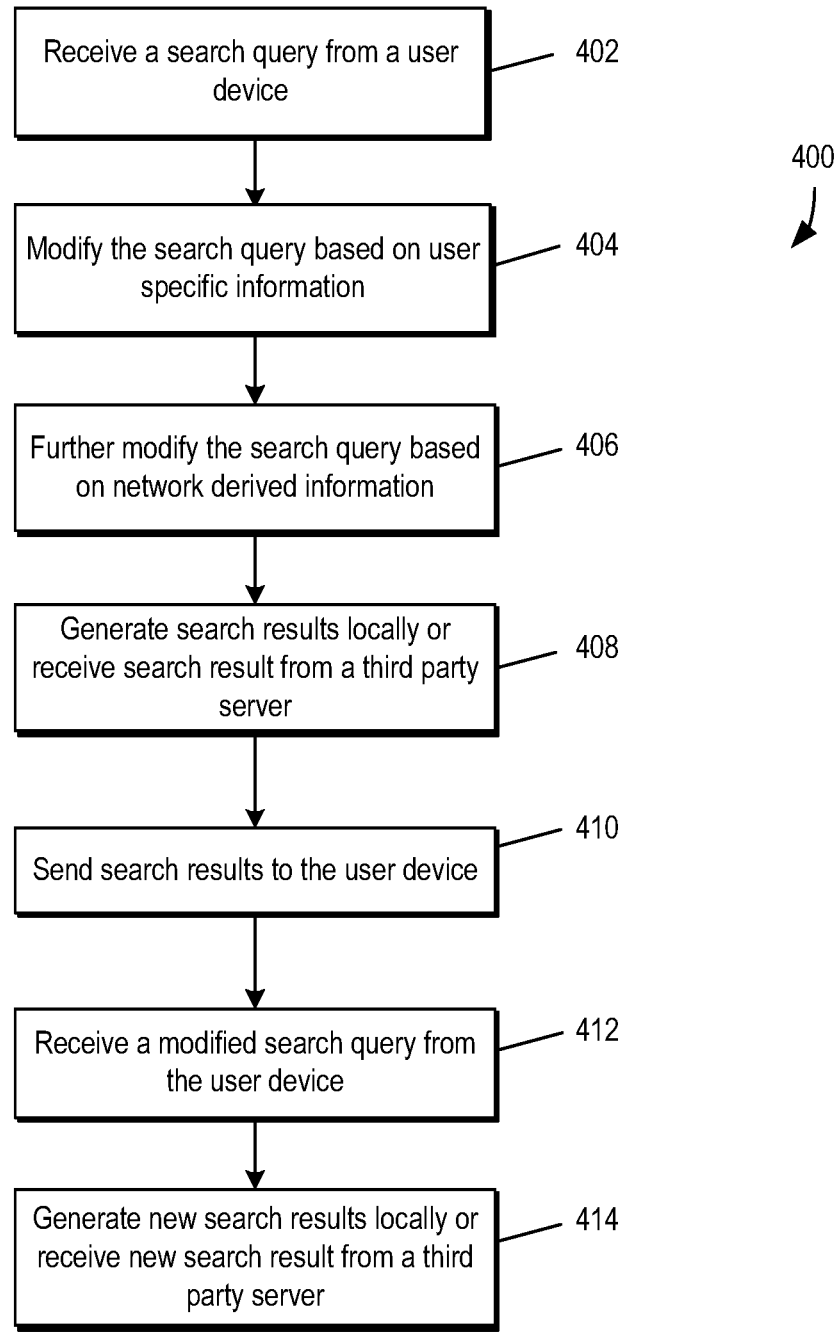
FIG. 4 depicts a flow diagram of an example process of a method for performing personalized, interactive and intelligent searches.

FIG. 4 depicts a flow diagram of an example process 400 of a method for performing personalized, interactive and intelligent searches. Process 400 takes place on a remote server. In particular, at least part of query processing takes place on the remote server.

At step 402, a search query is received at the remote server (e.g., from user device 102). Further processing of the search query takes place at steps 404 and 406. At step 404, the search query is modified based on user specific information. This step can be an alternative to processing on user device 102. In some embodiments, a user profile is established at the remote server for each user and personalized information relating to the user is also stored on the server. The computing power of a server would permit faster processing. To address user privacy concerning, additional security should be applied to guide such personalized data. In addition, biometric data can be used to authenticate a user before the user is allowed to use such information for query modification.

At step 406, a query can be further modified based on network derived information. Again, the computing power of a server would permit faster processing. In addition, it is possible for a server to host local database concerning such network derived information, hence further increasing processing speed.

In some embodiments, steps 404 and 406 are combined in a functionality that can be called an AI fusion engine where a multitude of information is applied to refine/process a search query on the server in one method step. To achieve this purpose, the server system will have following input: query information from one or more of the processing modules on user device 102, the user information (either received from user database 114 on user device 102 or received from a local database on the server), date/time, geolocation-related information, the big data output from big data database (either as accessible online information or from a local database on the server).

If there is user feedback, the input to the system would also include the user feedback information (e.g., from feedback analysis module 170 on user device 102).

In some embodiments, all the above input is in the machine language format. In some embodiments, the AI fusion engine uses artificial intelligent mechanisms to process a query based all or part of the available information. As disclosed herein, the AI engine may apply deep learning mechanism (such as Convolutional Neural Network or CNN, Recurrent Neural Network or RNN, combination of CNN and RNN, and etc.), wide learning mechanism, neural networks, a self-organization map, reinforcement learning mechanism, traditional feature extraction and pattern recognition methods (e.g., descriptor-based methods, Hidden Markov model, etc.), a knowledge graph, machine learning methods, or any combinations thereof.

In some embodiments, the AI fusion methods at steps 404 and 406 on the server have different purposes than those in one or more of the query processing modules on user device 102. In the latter, the goal is to understand the query input and transfer the input into machine language. Here, the goal is to use the artificial intelligence to perform fusion and in-depth understanding of a search query. For example, training data for these two methods would be totally different. Also, the AI infrastructure can be very different on the user device and on the server.

The input to the AI fusion engine is not just a static input from varies input modules. Rather, it can be from an intelligent request from the AI fusion engine during the AI evaluation for more information. In particular, the input information about the user, geolocation, and detailed information from the big data analysis can be requested from the server at steps 404 and 406, based on the search refinement needs.

Advantageously, because of the exemplary features outlined above, the output from the AI fusion engine can mitigate ambiguity and provide much more refined query information.

At step 408, search results are generated based on the modified query from the AI fusion engine, either locally at the server or via a third party search engine. Because artificial intelligence is applied when devising search queries, it is possible to leverage existing search engine, such as Google or Bing to perform text search and then use AI to perform automatic filtering and selection based the refined search criteria!

Existing search engines (e.g., Google/Bing) provides search results with URL information and short text summary, which is well suited for the internet and mobile phone situation. However, this would not be intuitive for users using the AR system. Or, in other words, this kind of search results would not suitable for the AR system. In an AR-based system, it would be intuitive for the user to see images (2D, 3D, videos) along with key words, rather than long sentences/paragraph preview of the search research results.

For example, according to the system disclosed herein, an AI-based search would first get the relevant information location on the cloud/internet/local system. Then, it uses artificial intelligence to rank the relevance and also search deeper in the place to get the image/video/icon, or something more visual from the search results and display the results to the users in a well ranged and visually appealing way for the user.

Once the results are sent back to user device 102, the user can then click (e.g., using gesture, eye movement, or voice command) to get further information of the chosen result.

At 410, search results are sent back to user device from the remote server.

In some embodiments, when user feedback is necessary, remote server receives a further modified search query based on user feedback from the user device at step 412. At step 414, new search results are generated based on the query from step 412, either locally or at a third party search engine.

In some embodiments, a user can specify, a limit on the number of search results the user would like to receive. In some embodiments, such a limit can be specified in a user preference profile for the user before a query is sent to the remote server. In some embodiments, such a limit can be specified as part of the user feedback after a user receives some initial search results from the search. Once such a limit is set, the remote server can automatically and iteratively refine search results to meet the limit. The same principal can be applied in other aspects of the functionality of the remote server. Much of the tasks can be automatically run with no or little user input. In some embodiments, a certain level of autonomy is built into the system. As a result, many aspects of the functionality of the remote server can be automatically run with no or little user input.

The systems illustrated in FIGS. 1-4 described hereinabove offer numerous advantages, in particular in connection with searches within an augmented reality system. For example, the systems and methods disclosed herein allow different kind of query inputs from the user, which includes voice, gesture, eye movement, body language, and etc., along with text and any file. This makes a search (e.g., in an AR system) more flexible, convenient and user friendly.

The systems and methods disclosed herein intelligently analyze the query input from the user to generate the query information using artificial intelligence. It helps to mitigate some ambiguity from the query input and also transfer the human friendly input to be machine understandable information.

The systems and methods disclosed herein can automatically perform user identification non-intrusively and continuously. This information will be used to provide personalized search result for the user. And this is to also help mitigate the ambiguity of the search result.

The systems and methods disclosed herein can leverage the user information, the date/time, the geolocation, the interactive user feedback information, and big data together using artificial intelligence engine to provide much more efficient and refined search information.

The systems and methods disclosed can perform search not as the existing search engines do, and more importantly, it can the organize the search results and make the search results displayed in a visually appealing way, instead of just texts/URLs. Rather, the current systems and methods would go deeper to the search result to extract key image/video to show to the users to make it visually appealing and convenient for user to see the search results without reading a lot of texts.

Our system can continuously monitor the user's behavior to understand the user search feedback based on user explicitly and inexplicitly feedbacks. If the user is unsatisfied with the search result, our system will take additional feedback information from the user to further perform search. The user actively interacts with the system during the search to ensure more efficient, and accurate search results.

The systems and methods disclosed is much more intelligent, accurate, convenient and user friendly than the existing search engines. In particular, it is a revolutionary design within the context of an AR system.

Example System Architecture

Figure 5:
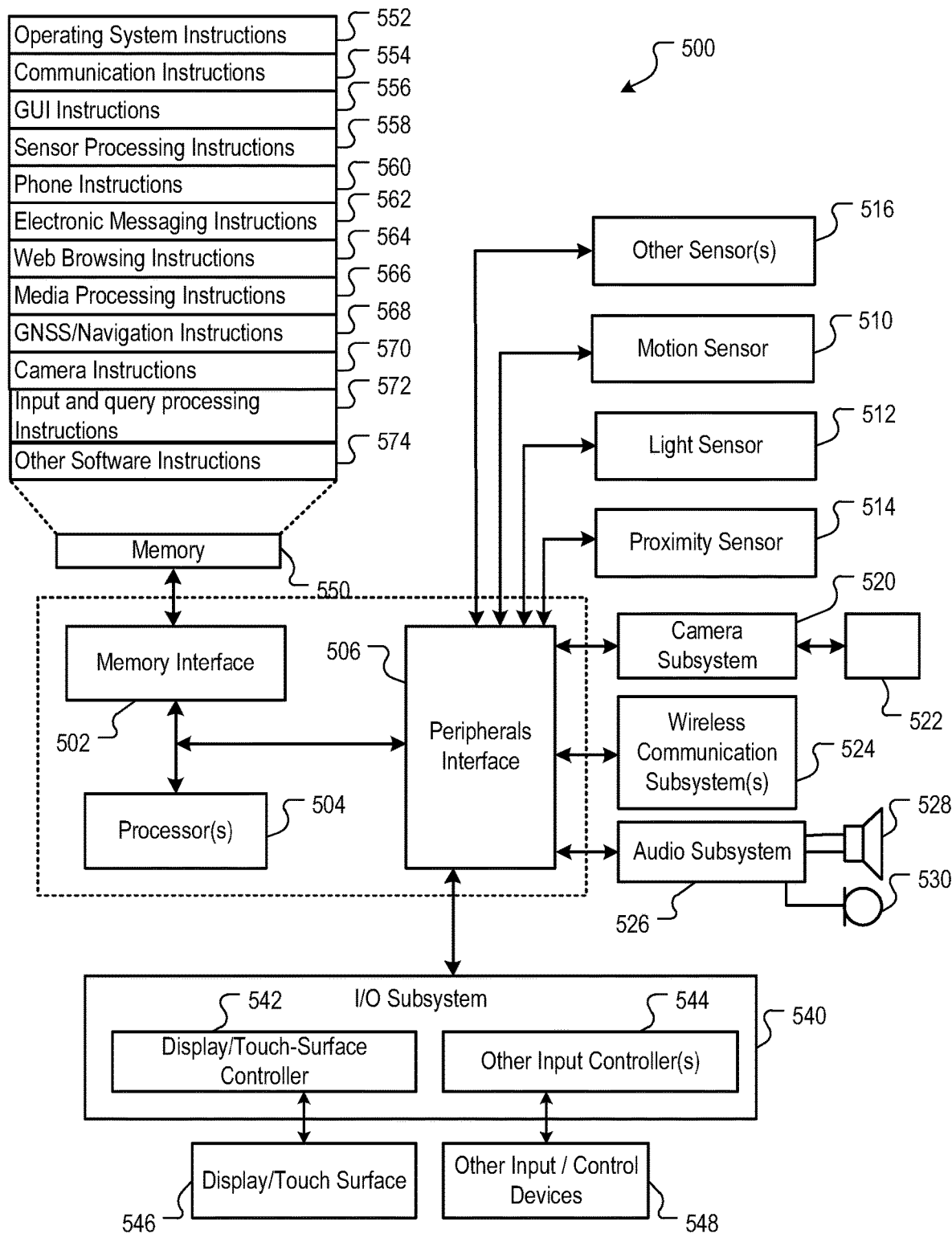
FIG. 5 depicts a block diagram of an example system architecture for implementing the features and processes of FIGS. 1-4.

FIG. 5 is a block diagram of an example computing device 500 that can implement the features and processes of FIGS. 1-4. The computing device 500 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. The various components in the computing device 500 can be coupled by one or more communication buses or signal lines.

Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate orientation, lighting, and proximity functions. Other sensors 516 can also be connected to the peripherals interface 506, such as a global navigation satellite system (GNSS) (e.g., GPS receiver), an accelerometer, a gyro sensor, a temperature sensor, a biometric sensor, magnetometer or other sensing device, to facilitate related functionalities.

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips. The camera subsystem 520 and the optical sensor 522 can be used to collect images of a user to be used during authentication of a user, e.g., by performing facial recognition analysis. For example, camera subsystem 520 includes but is not limited to 2D camera, 3D camera, combination of 2D/3D camera, Infrared camera, near infrared camera, ultra violet camera, multiple spectrum camera, hyperspectral camera, and combination of multiple cameras.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the computing device 500 is intended to operate. For example, the computing device 500 can include communication subsystems 524 designed to operate over a GSM network, a GPRS network, an EDGE network, a Wi-Fi or WiMax network, and a Bluetooth™ network, and etc. In particular, the wireless communication subsystems 524 can include hosting protocols such that the device 100 can be configured as a base station for other wireless devices. Exemplary wireless system 524 includes but is not limited to wireless internet (WLAN, wifi, etc.), wired internet, Bluetooth, 2G/3G/4G/5G wireless, etc.

An audio subsystem 526 can be coupled to a speaker 528 and a microphone 530 to facilitate voice-enabled functions, such as speaker recognition, voice replication, digital recording, and telephony functions. The audio subsystem 526 can be configured to facilitate processing voice commands, voice printing and voice authentication, for example. An audio subsystem 526 includes but is not limited to regular microphone, HD microphone, stereo microphone, and combination of multiple microphones.

The I/O subsystem 540 can include a display/touch-surface controller 542 and/or other input controller(s) 544.

The display controller 542 can be coupled to a display device 546 such as touch surface. The display/touch surface device 546 and associated display controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with display/touch surface 546 can be AR glass display, or regular display (mobile phone display, TV display, etc.)

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of the speaker 528 and/or the microphone 530.

In one implementation, a pressing of the button for a first duration can disengage a lock of the display device 546; and a pressing of the button for a second duration that is longer than the first duration can turn power to the computing device 500 on or off Pressing the button for a third duration can activate a voice control, or voice command, module that enables the user to speak commands into the microphone 530 to cause the device to execute the spoken command. The user can customize a functionality of one or more of the buttons. The display device 546 can, for example, also be used to implement virtual or soft buttons and/or a keyboard.

In some implementations, the computing device 500 can present recorded audio and/or video files, such as MP3, AAC, and MPEG files. In some implementations, the computing device 500 can include a smartphone, a tablet device, a laptop computer, or a wearable device (e.g., smart watch, smart glasses, etc.), a gaming system, an AR-based device, and/or an MR-based system. Exemplary AR devices include AR glass goggles (e.g., Microsoft Hololens, Epson® Moverio glasses, etc.), and AR headset (e.g., Oakley airwave, etc.).

Exemplary MR system includes Microsoft Kinect in combination with an Xbox and a display; Intel realsense camera in combination with a computer, and etc. Exemplary smart-phone based AR systems can include virtually any smart phones that are equipped with a camera/mic and other sensors.

The memory interface 502 can be coupled to memory 550. The memory 550 can include high-speed random access memory and/or non-volatile memory, such as one or more magnetic disk storage devices, one or more optical storage devices, and/or flash memory (e.g., NAND, NOR). The memory 550 can store an operating system 552, such as Darwin, RTXC, LINUX, UNIX, OS X, WINDOWS, or an embedded operating system such as VxWorks.

The operating system 552 can include instructions for handling basic system services and for performing hardware dependent tasks. In some implementations, the operating system 552 can be a kernel (e.g., UNIX kernel). In some implementations, the operating system 552 can include instructions for performing voice authentication. For example, operating system 552 can implement the image processing features as described with reference to FIGS. 1-4.

The memory 550 can also store communication instructions 554 to facilitate communicating with one or more additional devices, one or more computers and/or one or more servers. The memory 550 can include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS and navigation-related processes and instructions; and/or camera instructions 570 to facilitate camera-related processes and functions.

The memory 550 can store user input and query processing instructions 572 to facilitate other processes and functions, such as the image processing processes and functions as described with reference to FIGS. 1-4.

The memory 550 can also store other software instructions 574, such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions of the computing device 500 can be implemented in hardware and/or in software, including in one or more signal processing and/or application specific integrated circuits.

FIG. 6 depicts a block diagram of an example remote server system architecture implementing for the features and processes of FIGS. 1-4.

In some embodiments, remote data server 600 may comprise a central processing unit 610, a power source 612, a user interface 620, communications circuitry 616, a bus 614, a controller 626, an optional non-volatile storage 628, and at least one memory 330.

Memory 630 may comprise volatile and non-volatile storage units, for example random-access memory (RAM), read-only memory (ROM), flash memory and the like. In preferred embodiments, memory 630 comprises high-speed RAM for storing system control programs, data, and application programs, e.g., programs and data loaded from non-volatile storage 628. It will be appreciated that at any given time, all or a portion of any of the modules or data structures in memory 630 can, in fact, be stored in memory 628.

User interface 620 may comprise one or more input devices 624, e.g., keyboard, key pad, mouse, scroll wheel, and the like, and a display 622 or other output device. A network interface card or other communication circuitry 616 may provide for connection to any wired or wireless communications network, which may include the Internet and/or any other wide area network, and in particular embodiments comprises a telephone network such as a mobile telephone network. Internal bus 614 provides for interconnection of the aforementioned elements of centralized data server 600.

In some embodiments, operation of centralized data server 600 is controlled primarily by operating system 632, which is executed by central processing unit 610. Operating system 632 can be stored in system memory 630. In addition to operating system 632, a typical implementation system memory 630 may include a file system 634 for controlling access to the various files and data structures used by the present invention, one or more application modules 636, and one or more databases or data modules 650.

In some embodiments in accordance with the present invention, applications modules 636 may comprise one or more of the following modules described below and illustrated in FIG. 6.

Query Processing Application 638. In some embodiments in accordance with the present invention, a query processing application 638 receives and processes search queries between a client device and the remote data server.

By applying computation techniques (e.g., hash functions), data processing application 638 turns input data, sensor data, network derived data into digital data to construct one or more databases (e.g., 655-648).

Content Management Tools 640. In some embodiments, content management tools 640 are used to organize different forms of databases 652 into multiple databases, e.g., a processing mechanism database 654, a geolocation database 656, a network based trending database 658, a query database 660, a user profile and authentication database 662 and additional database 664. In some embodiments in accordance with the present invention, content management tools 640 are used to search and compare any of the databases hosted on the remote data server 600. Contents in accordance with the invention may be a text message, a URL, a web link, a note message, a post message, sensor data, a file, an image, an audio file, a video file, a flash file, a media file, a slideshow file, or any printable or visualizable file.

The databases stored on remote data server 600 comprise any form of data storage system including, but not limited to, a flat file, a relational database (SQL), and an on-line analytical processing (OLAP) database (MDX and/or variants thereof). In some specific embodiments, the databases are hierarchical OLAP cubes. In some embodiments, the databases each have a star schema that is not stored as a cube but has dimension tables that define hierarchy. Still further, in some embodiments, the databases have hierarchy that is not explicitly broken out in the underlying database or database schema (e.g., dimension tables are not hierarchically arranged). In some embodiments, the databases in fact are not hosted on remote data server 300 but are in fact accessed by centralized data server through a secure network interface. In such embodiments, security measures such as encryption is taken to secure the sensitive information stored in such databases.

System Administration and Monitoring Tools 642. In some embodiments in accordance with the present invention, system administration and monitoring tools 642 administer and monitor all applications and data files of remote data server 6. Because personalized data such as biometrics are stored on remote data server 600, it is important that access those files that are strictly controlled and monitored. System administration and monitoring tools 642 determine which user devices have access to remote data server 600 based on strict user authentication. In some embodiments, multiple rounds of authentication may be needed. In some embodiments, system administration and monitoring tools 642 use more than one security measure to protect the data stored on remote data server 600. In some embodiments, a random rotational security system may be applied to safeguard the data stored on remote data server 600.

Network Application 646. In some embodiments, network applications 646 connect a remote data server 600 through multiple network services. A remote data server 600 is connected to multiple types of user devices, which requires that remote data server be adapted to communications based on different types of network interfaces, for example, router based computer network interface, switch based phone like network interface, and cell tower based cell phone wireless network interface, for example, an 802.11 network or a Bluetooth network.

Customer Support Tools 648. Customer support tools 648 assist users with information or questions regarding their accounts, technical support, privacy or feedback on search qualities, etc.

In some embodiments, each of the data structures stored on remote data server 600 is a single data structure. In other embodiments, any or all such data structures may comprise a plurality of data structures (e.g., databases, files, and archives) that may or may not all be stored on remote data server 600. The one or more data modules 650 may include any number of databases 652 organized into different structures (or other forms of data structures) by content management tools 640:

In addition to the above-identified modules, data 650 may also be stored on remote data server 600. Exemplary databases 652 include processing mechanism database 654, geolocation database 656, network based trending database 658, query database 660, and user profile and authentication dataset 662, which are described below in more details.

Processing Mechanism Database 654. Any applicable mechanisms may be stored in processing mechanism database 654. Such mechanisms are not limited to those for query process. Additional mechanisms such as those used for processing search results can also be stored in processing mechanism database 654.

Geolocation Database 656. In some embodiments, remote data server 600 hosts a geolocation database 656. Geolocation database 656 stores and organizes geolocation related data such as time, weather, location-related events, history, map, and news and etc.

Network Based Trending Database 658. As disclosed herein, any network derived information can be stored in network based trending database 658. In some embodiments, such data include recent popular queries, events, domain knowledge and other related information.

Query Database 660. In some embodiments, past queries are stored in query database 660. Past query data themselves can be used as trending data to guide and help modify future search queries. In some embodiments, search queries may be stored and organization in connection with the corresponding user profiles (e.g., from user profile database 662), thus providing user-specific query data that can be used as a reference.

User Profile Database 662. In some embodiments in accordance with the present invention, a user profile database 662 may be created and stored on remote data server 600 where passwords and authentication data concerning the users are stored and managed. In some embodiments, users are given the opportunity to choose security settings. In addition, a user can choose and set preferences for how they would like to receive the search results. For example, a user can specify a upper limit for the number of search results. In some embodiments, a user can specify the style in which they would like the search results to be presented.

The present invention can be implemented as a computer system and/or a computer program product that comprises a computer program mechanism embedded in a computer readable storage medium. Further, any of the methods of the present invention can be implemented in one or more computers or computer systems. Further still, any of the methods of the present invention can be implemented in one or more computer program products. Some embodiments of the present invention provide a computer system or a computer program product that encodes or has instructions for performing any or all of the methods disclosed herein. Such methods/instructions can be stored on a CD-ROM, DVD, magnetic disk storage product, flash drive, or any other computer readable data or program storage product. Such methods can also be embedded in permanent storage, such as ROM, one or more programmable chips, or one or more application specific integrated circuits (ASICs). Such permanent storage can be localized in a server, 802.11 access point, 802.11 wireless bridge/station, repeater, router, mobile phone, or other electronic devices. Such methods encoded in the computer program product can also be distributed electronically, via the Internet or otherwise, by transmission of a computer data signal (in which the software modules are embedded) either digitally or on a carrier wave.

Some embodiments of the present invention provide a computer system or a computer program product that contains any or all of the program modules as disclosed herein. These program modules can be stored on a CD-ROM, DVD, flash drive, magnetic disk storage product, or any other computer readable data or program storage product. The program modules can also be embedded in permanent storage, such as ROM, one or more programmable chips, or one or more application specific integrated circuits (ASICs). Such permanent storage can be localized in a server, 802.11 access point, 802.11 wireless bridge/station, repeater, router, mobile phone, or other electronic devices. The software modules in the computer program product can also be distributed electronically, via the Internet or otherwise, by transmission of a computer data signal (in which the software modules are embedded) either digitally or on a carrier wave.

EXAMPLE

The following non-limiting examples are provided to further illustrate embodiments of the invention disclosed herein. It should be appreciated by those of skill in the art that the techniques disclosed in the examples that follow represent approaches that have been found to function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention.

Example 1

Search Scenario Comparison 1

In this example, the term "shoes" is used to illustrate differences between conventional search engine and the present invention, for example, if the user is using Google.

We type "shoes" in Google, we will get over 1.7 Billion search results (FIG. 7A). It includes men's and women's shoes; kids' and adults' shoes; shoes from many different kinds of brands; shoes from different e-commerce stores and local stores; shoes with different sizes; shoes from different seasons; shoes with different colors; shoes with different prices; etc. As a result, it would not be efficient and useful for the user to go through the search result. It couldn't provide accurate relevant information for the user. The search result is in texts and hyperlinks. This is not visually friendly to the users.

Figure 7B:
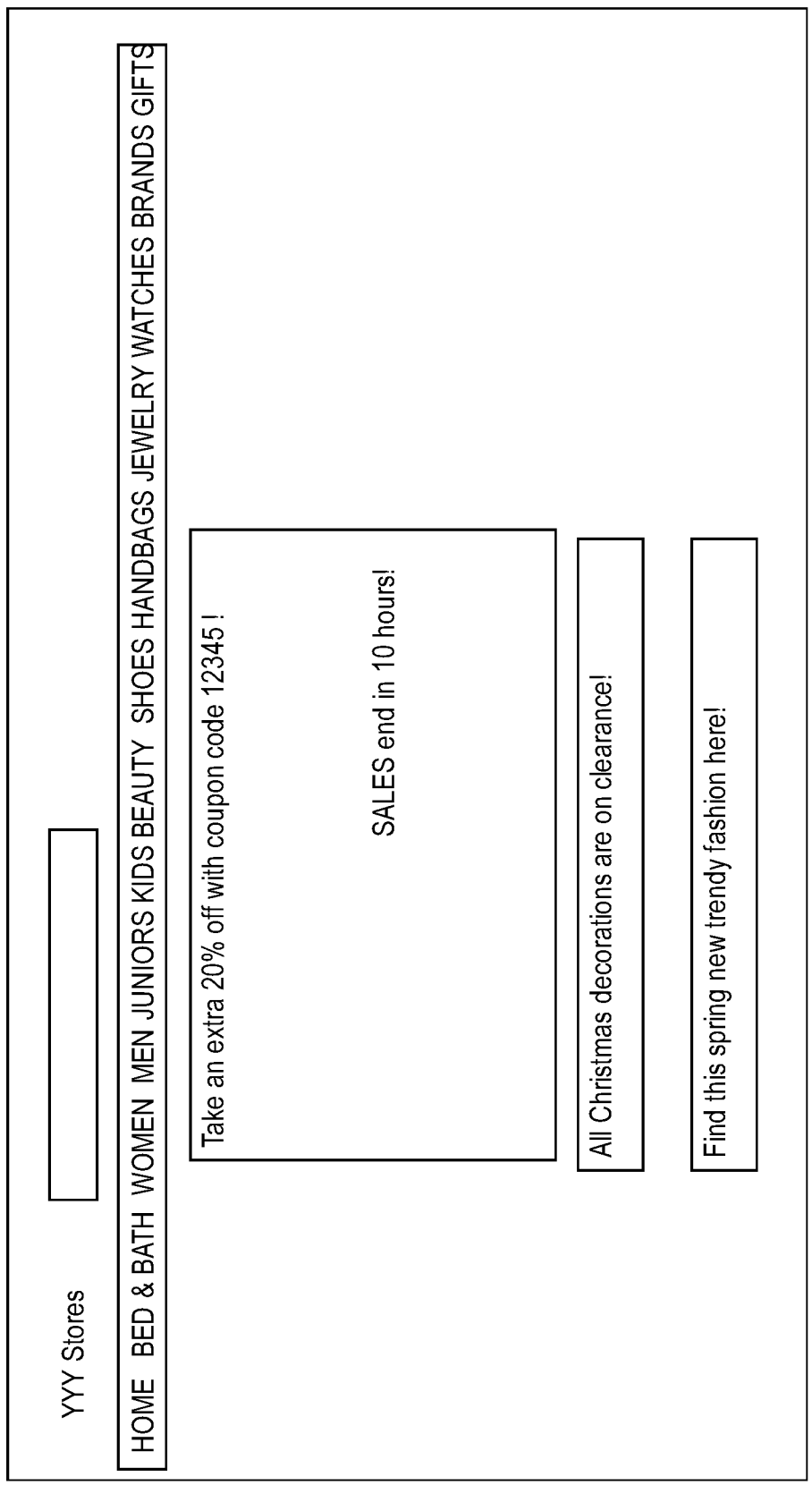
FIG. 7B depicts a sample results page using a conventional search method.

When they click into one of the search result links, it then gets into a website (FIG. 7B). In this website, there are a lot of different kinds of merchandises besides shoes and the user needs to search and compare prices. This is very inefficient and inconvenient.

In contrast, according to the current invention, the user no-longer needs to type into our search engine. The user can say "shoes" or point to his/her shoes to initiate a search.

The current system would be able to recognize the user. From there, it is possible to get the user shoe size information. It is also possible to also get the past user purchase information and intelligently understand the user shoe purchase price, shoe color, style brand, etc. preferences. If permitted by the user, the current system can also access to the user calendar and understand the user's meetings and working status and family events, etc.

The current system knows the date and time of the search; the geolocation of the search to understand the temperature, season, weather and other information. The current system uses the big data to knows the current trend of the shoes, the sales of the shoes, and other information. The current system uses user's financial information and purchase preference to limit the shoes to certain price range.

Using the AI-based Fusion module, our system can greatly refine the search to be a pair of male winter shoes with size 10, preferably black, with price $100-New Balance, etc. This winter is quite cold in Indianapolis, Ind. where the user is living and working at. So the shoes need to be thicker.

A AI-based fusion module finds about 437 such search results available. The first 12 results are presented with shoes pictures and prices to the user (FIG. 8). It includes shoe images, prices, user reviews, color choices, brand name, and etc. The presentation makes it easier for the user to browse.

If the use click on the shoe image, it would include more info about this shoe, which can include 3D view of the shoe, the detailed info about the materials used for this shoe, and other related information. All very visual and easy for user to see and understand.

In comparison, the current system can automatically refine the search results based on user information, date/time, geolocation-related info, and big data to dramatically improve the search accuracy, efficiency and convenience.

In addition, the current system can display the information more visually and convenient for the user.

Example 2

Search Scenario Comparison 2

In this example, the input query is "John's shoes"

If use existing search engine to search, it comes back with over 12.5 Million results and the top results are with some shoe companies with "John" in the name (FIG. 9).

The current system recognizes the user and from the user information, it is understood that the user has a 3-year old son named John. Based on past purchase information, it is also known that the user purchase shoes with boy size 12 five months ago. And the child is growing. So John's size is about boy size 13 now. Based on previous records, the user tends to purchase running shoes for the 3 year old within the price range $30-$50. The user likes the shoes to have certain cute styles for kids, preferably with some flash lights. The user likes to brands Nike, New Balance, and Reebok for his son. It is March in Orlando, Fla. and it is getting warmer this year. So the shoes need to be easier for the boy's feet to release heat.

With all the above information, the search result is narrowed down to less than 50 pairs of shoes for the user to select (FIG. 10).

Example 3

Search Scenario Comparison 3

In this example, the input query is "Dance"

If use existing search engine only allows the text input to search, which is "dance" and it comes back with over 1.57 Billion results with top results in dance academy and dance schools in Google (FIG. 11).

The current system recognizes the user is a five year old girl named Sarah. She has been taking ballet lessons. Her body language shows that a small ballet dance move. The location/time was in San Francisco, Calif. on Nov. 20, 2016.

However, with this information, it is still very ambiguity. The current system cannot narrow the search result satisfactorily. Based on the past search preference by the user, the system provided the dance music, famous dance video and dance dress category information to the user instead of detailed search results (FIG. 12A).

Here, using the category information instead of detailed search results is a way for the system to actively interact with the user to get further clarification and refinements for the personalized search.

The user viewed the search result and she is unsatisfied. She waved her head and said "my video."

Figure 12B:
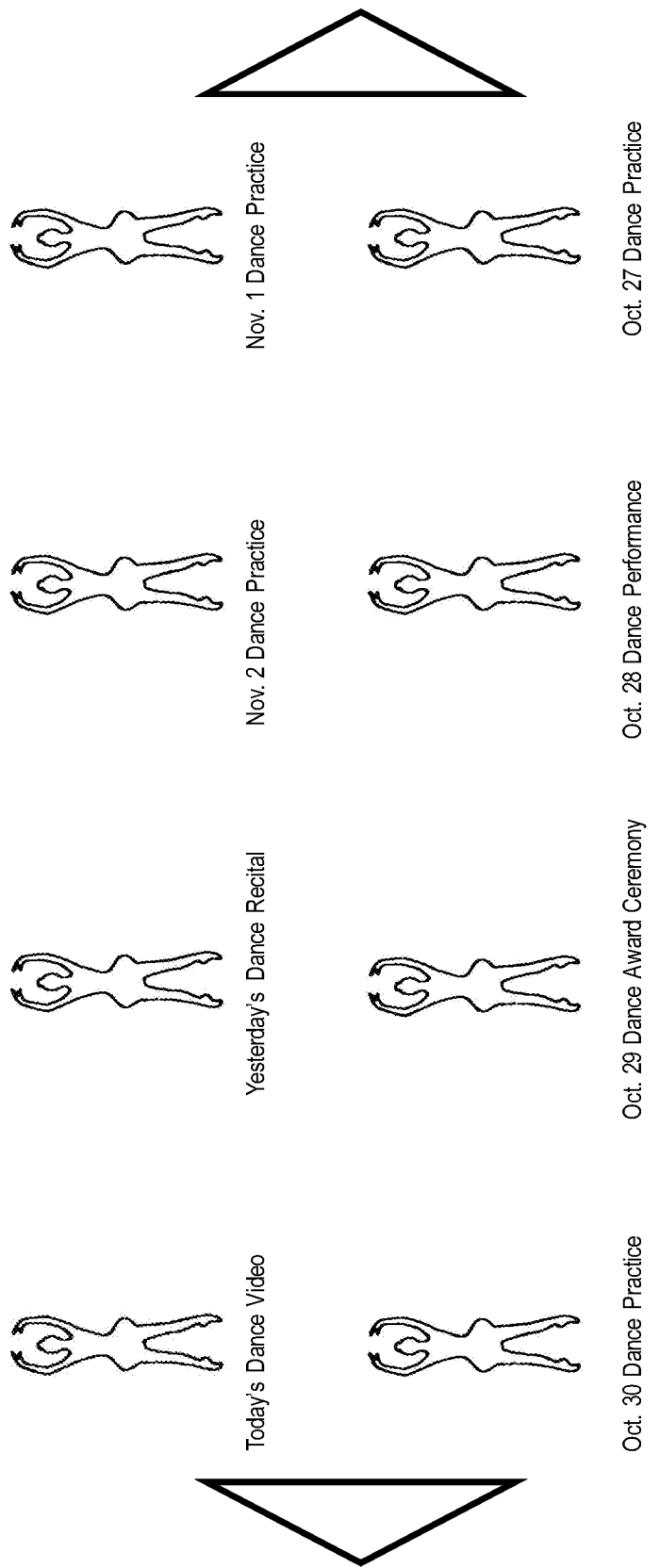

The system combined the "my video" into the AI-based fusion engine to have much more refined query info: Sarah's dance video. Based on the dance move of the girl presented in the first query, the system ranked the dance video with similar moves higher and presented the search result to the user (FIG. 12B).

The user selected the top one search results and enjoy watching her own dance video. The system understands that this search task is finished.

The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as may be taught or suggested herein. A variety of advantageous and disadvantageous alternatives are mentioned herein. It is to be understood that some preferred embodiments specifically include one, another, or several advantageous features, while others specifically exclude one, another, or several disadvantageous features, while still others specifically mitigate a present disadvantageous feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be mixed and matched by one of ordinary skill in this art to perform methods in accordance with principles described herein. Among the various elements, features, and steps some will be specifically included and others specifically excluded in diverse embodiments.

Although the invention has been disclosed in the context of certain embodiments and examples, it will be understood by those skilled in the art that the embodiments of the invention extend beyond the specifically disclosed embodiments to other alternative embodiments and/or uses and modifications and equivalents thereof.

Many variations and alternative elements have been disclosed in embodiments of the present invention. Still further variations and alternate elements will be apparent to one of skill in the art.

In some embodiments, the numbers expressing quantities of ingredients, properties such as molecular weight, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

In some embodiments, the terms "a" and "an" and "the" and similar references used in the context of describing a particular embodiment of the invention (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments of this invention are described herein. Variations on those preferred embodiments will become apparent to those of ordinary skill in the art upon reading the foregoing description. It is contemplated that skilled artisans can employ such variations as appropriate, and the invention can be practiced otherwise than specifically described herein. Accordingly, many embodiments of this invention include all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In closing, it is to be understood that the embodiments of the invention disclosed herein are illustrative of the principles of the present invention. Other modifications that can be employed can be within the scope of the invention. Thus, by way of example, but not of limitation, alternative configurations of the present invention can be utilized in accordance with the teachings herein. Accordingly, embodiments of the present invention are not limited to that precisely as shown and described.

I claim:

1. A method for providing interactive and intelligent searches using a remote server comprising:
   identifying, at the remote server, a search query based on a user's image input, the image input collected in real-time from a camera, said image input including at least a portion of the user's body separate from the user's face;
   attempting to authenticate the user using biometric information;
   granting access to private information based on a successful authentication result;
   limiting access to the private information based on a failed authentication result;
   modifying the search query based on information accessible by the remote server, as determined by the authentication result, using artificial intelligence to render a modified query;
   sending search results from the remote server to a user device; and
   checking for user input suggesting to end the search.

2. The method of claim 1, wherein the information accessible by the remote server comprises user biometric data, user personal data, other people's information that the user has permission to access, existing search records, information stored in the user device, system information of the user device, information stored in the remote server, information that is extracted through real-time network communication at the time when the search query is modified, or any combinations thereof.

3. The method of claim 1, wherein the remote server checks for user feedback that the search query result is unsatisfactory at any query processing stage.

4. The method of claim 1, wherein the user device comprises a smart phone, a laptop, a tablet, a headset, a glass set, a goggle set, a gaming system, a computer with video and audio input capacity, or combinations thereof.

5. The method of claim 1, further comprising:
   modifying, at the remote server, the modified query based on user feedback to render a further modified query.

6. The method of claim 5, further comprising:
   communicating the further modified-query from the remote server to the user device.

7. The method of claim 1, wherein the search results are processed at the remote server to enhance graphic elements from the search results for immersive user experience.

8. The method of claim 1, wherein the search results are processed at the remote server to remove restricted contents for child users.

9. The method of claim 1, wherein the user device can automatically perform continuous recognition of the user in the background.

10. A remote server comprising:
    one or more processors; and
    a non-transitory computer readable medium including one or more sequences of instructions that, when executed by the one or more processors, cause the processors to:
    receive and identify a search query based on a user image input, the image input collected in real-time from a camera, said image input including at least a portion of the user's body separate from the user's face;
    attempt to authenticate the user using biometric information;
    grant access to private information based on a successful authentication result;
    limit access to the private information based on a failed authentication result;
    modify the search query based on information accessible by the remote server, as determined by the authentication result, using artificial intelligence to render a modified query;
    send search results to a user device; and
    check for user input suggesting to end the search.

11. The system of claim 10, wherein the information accessible by the remote server comprises user biometric data, user personal data, other people's information that the user has permission to access, existing search records, information stored in the user device, system information of the user device, information stored in the remote server, information that is extracted through real-time network communication at the time when the search query is modified, or any combinations thereof.

12. The system of claim 10, wherein the search results are processed at the remote server to enhance graphic elements from the search results for immersive user experience.

13. The system of claim 10, wherein the search results are processed at the remote server to remove restricted contents for child users.

14. The method of claim 10, wherein accessibility by a user to the information accessible by the remote server requires authentication, said authentication comprising learned biometric data unique to the user and locally stored on the user device.

15. The system of claim 10, wherein the user device can automatically perform continuous recognition of the user in the background.

16. A non-transitory computer-readable storage medium having stored thereon program code instructions that, when executed by a processor of a message management service, cause the message management service to perform a method comprising:
    identifying, at the remote server, a search query based on a user's image input, the image input collected in real-time from a camera, said image input including at least a portion of the user's body separate from the user's face;
    attempting to authenticate the user using biometric information;
    granting access to private information based on a successful authentication result;
    limiting access to the private information based on a failed authentication result;

modifying the search query based on information accessible by the remote server, as determined by the authentication result, using artificial intelligence to render a modified query;

sending search results from the remote server to a user device; and checking for user input suggesting to end the search.

17. The non-transitory computer-readable storage medium of claim 16, wherein the information accessible by the remote server comprises user biometric data, user personal data, other people's information that the user has permission to access, existing search records, information stored in the user device, system information of the user device, information stored in the remote server, information that is extracted through real-time network communication at the time when the search query is modified, or any combinations thereof.

18. The non-transitory computer-readable storage medium of claim 16, wherein the search results are processed at the remote server to enhance graphic elements from the search results for immersive user experience.

19. The non-transitory computer-readable storage medium of claim 16, wherein the search results are processed at the remote server to remove restricted contents for child users.

20. The non-transitory computer-readable storage medium of claim 16, wherein accessibility by a user to the information accessible by the user device requires authentication, said authentication comprising learned biometric data unique to the user and locally stored on the user device.

21. The non-transitory computer-readable storage medium of claim 16, wherein the remote server can process feedback from a user at any query processing stage if a search query is unsatisfactory.

22. The non-transitory computer-readable storage medium of claim 16, wherein the user device can automatically perform continuous recognition of the user in the background.

* * * * *